(12) United States Patent
Yin et al.

(10) Patent No.: US 10,341,864 B2
(45) Date of Patent: Jul. 2, 2019

(54) NETWORK-BASED DEVICE REGISTRATION FOR CONTENT DISTRIBUTION PLATFORMS

(71) Applicant: Verizon Patent and Licensing Inc., Arlington, VA (US)

(72) Inventors: Fenglin Yin, Lexington, MA (US); Susan Kelly, Maynard, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 210 days.

(21) Appl. No.: 15/448,870

(22) Filed: Mar. 3, 2017

(65) Prior Publication Data
US 2018/0255456 A1 Sep. 6, 2018

(51) Int. Cl.
| H04L 9/32 | (2006.01) |
| H04W 12/06 | (2009.01) |
| H04W 12/04 | (2009.01) |
| H04L 9/08 | (2006.01) |
| H04L 9/06 | (2006.01) |
| H04L 29/06 | (2006.01) |
| G06F 21/41 | (2013.01) |

(52) U.S. Cl.
CPC .......... *H04W 12/06* (2013.01); *H04L 9/0643* (2013.01); *H04L 9/0825* (2013.01); *H04L 9/0866* (2013.01); *H04L 9/3213* (2013.01); *H04L 63/08* (2013.01); *H04L 63/0807* (2013.01); *H04L 63/0823* (2013.01); *H04L 63/0876* (2013.01); *H04W 12/04* (2013.01); *G06F 21/41* (2013.01); *H04L 2209/80* (2013.01)

(58) Field of Classification Search
CPC .... H04W 12/06; H04W 12/04; H04L 9/0866; H04L 9/30; H04L 9/3213; H04L 9/3263; H04L 9/3223; H04L 2209/80; H04L 63/08; H04L 63/0853; G06F 21/6218; G06F 21/34; G06F 21/10; G06F 21/31; G06F 21/64; G06F 2221/2135; G06Q 20/382; G06Q 20/3674
USPC ................ 726/2, 9, 27; 713/182; 705/53, 65
See application file for complete search history.

(56) References Cited

U.S. PATENT DOCUMENTS

| 7,925,751 | B1 * | 4/2011 | Bolinger | ........... G06F 17/30067 709/219 |
| 8,533,803 | B2 * | 9/2013 | Cha | ......................... G06F 21/34 726/7 |
| 8,588,742 | B2 * | 11/2013 | Oswal | ................... H04W 12/06 370/395.52 |

(Continued)

*Primary Examiner* — Saleh Najjar
*Assistant Examiner* — Michael W Chao

(57) ABSTRACT

A device can receive, from a network device, information that identifies a user device. The network device might have authenticated the user device based on the user device accessing a radio access network. The device can receive, from the user device, a request for a first token. The request can include an encrypted session identifier. A server device might have encrypted the session identifier. The device can determine the session identifier, and generate the first token based on the session identifier and the information that identifies the user device. The device can encrypt the first token using an application public key, and provide, to the user device, the encrypted first token. The user device can provide, to the server device, the encrypted first token. The server device can register the user device to receive content based on the encrypted first token.

20 Claims, 22 Drawing Sheets

(56) References Cited

U.S. PATENT DOCUMENTS

| | | | | |
|---|---|---|---|---|
| 8,763,101 B2* | 6/2014 | Counterman | H04W 12/06 | 713/168 |
| 8,763,154 B2* | 6/2014 | Yin | G06F 21/31 | 713/168 |
| 8,848,610 B2* | 9/2014 | Miklos | H04W 12/06 | 370/328 |
| 8,881,252 B2* | 11/2014 | Van Till | H04L 63/08 | 726/19 |
| 9,112,861 B2* | 8/2015 | Menezes | H04L 9/3213 | |
| 9,258,294 B2* | 2/2016 | Khalid | H04L 63/0815 | |
| 9,736,131 B2* | 8/2017 | Khalid | H04L 63/08 | |
| 9,853,965 B2* | 12/2017 | Yin | H04L 63/0823 | |
| 9,942,043 B2* | 4/2018 | Palanisamy | H04L 9/3213 | |
| 9,948,630 B2* | 4/2018 | Moran | H04L 63/08 | |
| 10,182,044 B1* | 1/2019 | Praus | H04L 63/08 | |
| 2006/0155993 A1* | 7/2006 | Busboon | G06F 21/31 | 713/169 |
| 2007/0101418 A1* | 5/2007 | Wood | G06F 21/31 | 726/8 |
| 2012/0072979 A1* | 3/2012 | Cha | G06F 21/34 | 726/7 |
| 2013/0086652 A1* | 4/2013 | Kavantzas | G06F 21/335 | 726/5 |
| 2013/0191929 A1* | 7/2013 | Yin | G06F 21/31 | 726/28 |
| 2013/0310003 A1* | 11/2013 | Sadhvani | H04W 12/06 | 455/411 |
| 2013/0318581 A1* | 11/2013 | Counterman | H04W 12/06 | 726/7 |
| 2014/0282993 A1* | 9/2014 | Van Till | H04L 63/08 | 726/9 |
| 2015/0067328 A1* | 3/2015 | Yin | H04L 9/3236 | 713/168 |
| 2015/0089621 A1* | 3/2015 | Khalid | H04L 63/08 | 726/9 |
| 2015/0188907 A1* | 7/2015 | Khalid | H04L 63/08 | 726/8 |
| 2015/0271671 A1* | 9/2015 | Oba | H04W 12/06 | 713/168 |
| 2015/0365403 A1* | 12/2015 | Counterman | H04L 63/0876 | 726/9 |
| 2016/0036804 A1* | 2/2016 | Moore | H04L 63/08 | 726/12 |
| 2017/0006008 A1* | 1/2017 | Moran | H04L 63/08 | |
| 2017/0126675 A1* | 5/2017 | Yin | H04L 63/0876 | |
| 2017/0208461 A1* | 7/2017 | Yin | H04W 12/06 | |
| 2017/0289197 A1* | 10/2017 | Mandyam | H04L 9/0825 | |
| 2018/0218168 A1* | 8/2018 | Goel | H04L 9/3239 | |

* cited by examiner

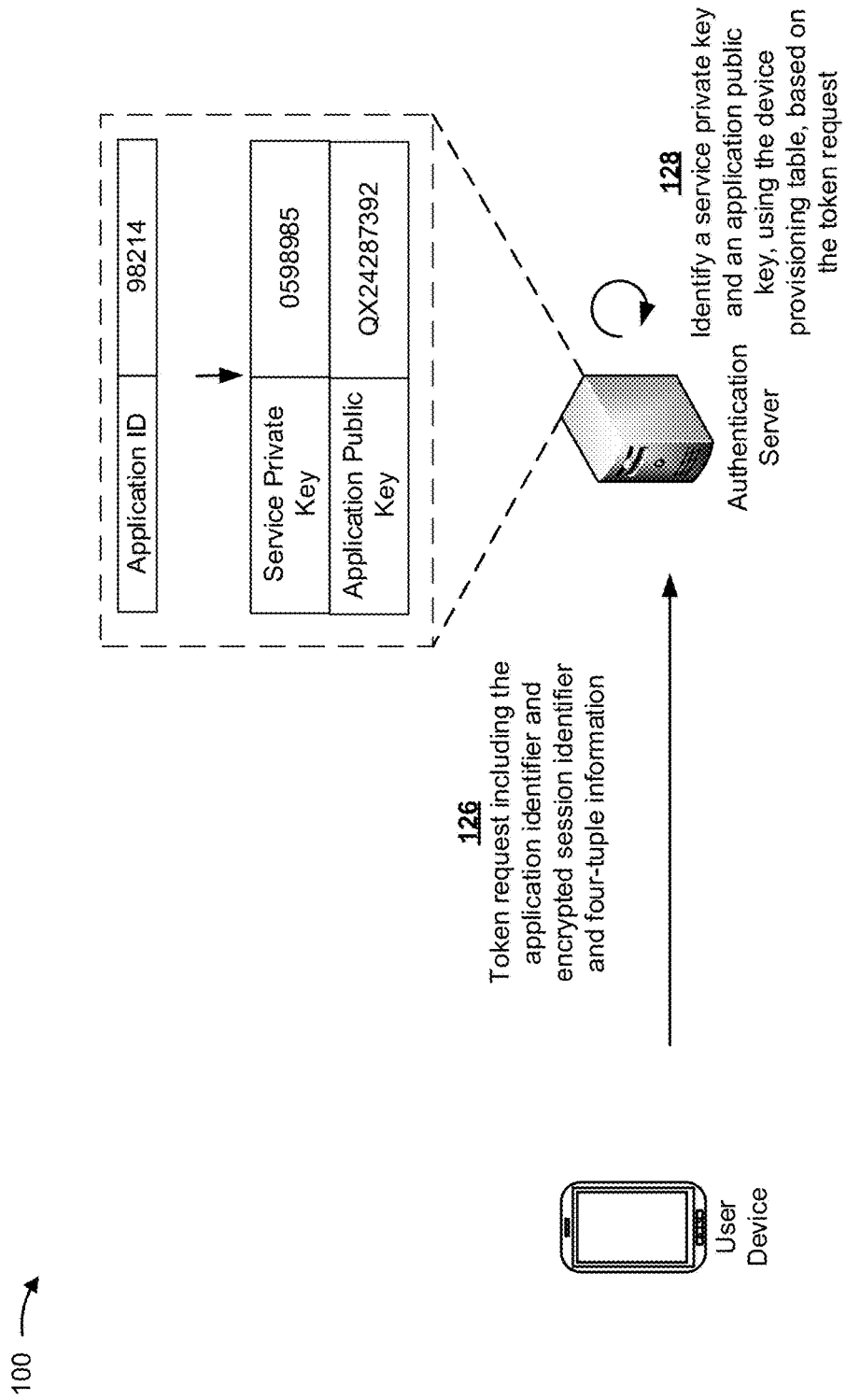

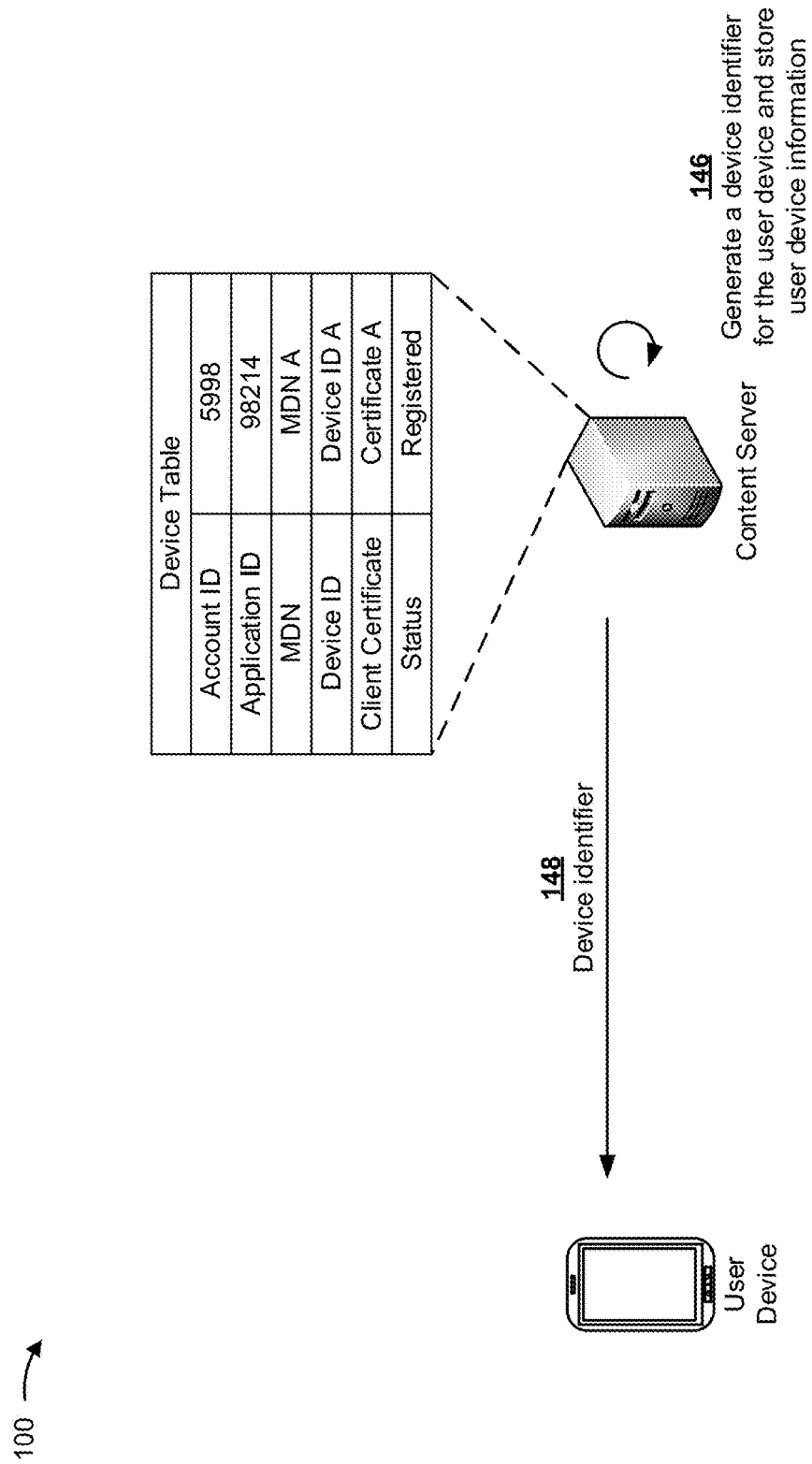

NETWORK-BASED DEVICE REGISTRATION FOR CONTENT DISTRIBUTION PLATFORMS

BACKGROUND

A digital certificate is an electronic credential that can be used to certify an identity of an individual, a device, and/or an entity that is using a network. A digital certificate can include information that identifies a public cryptographic key associated with a public key and private key pair, which can be used for authentication and encryption.

DETAILED DESCRIPTION OF PREFERRED EMBODIMENTS

Figure 1A:
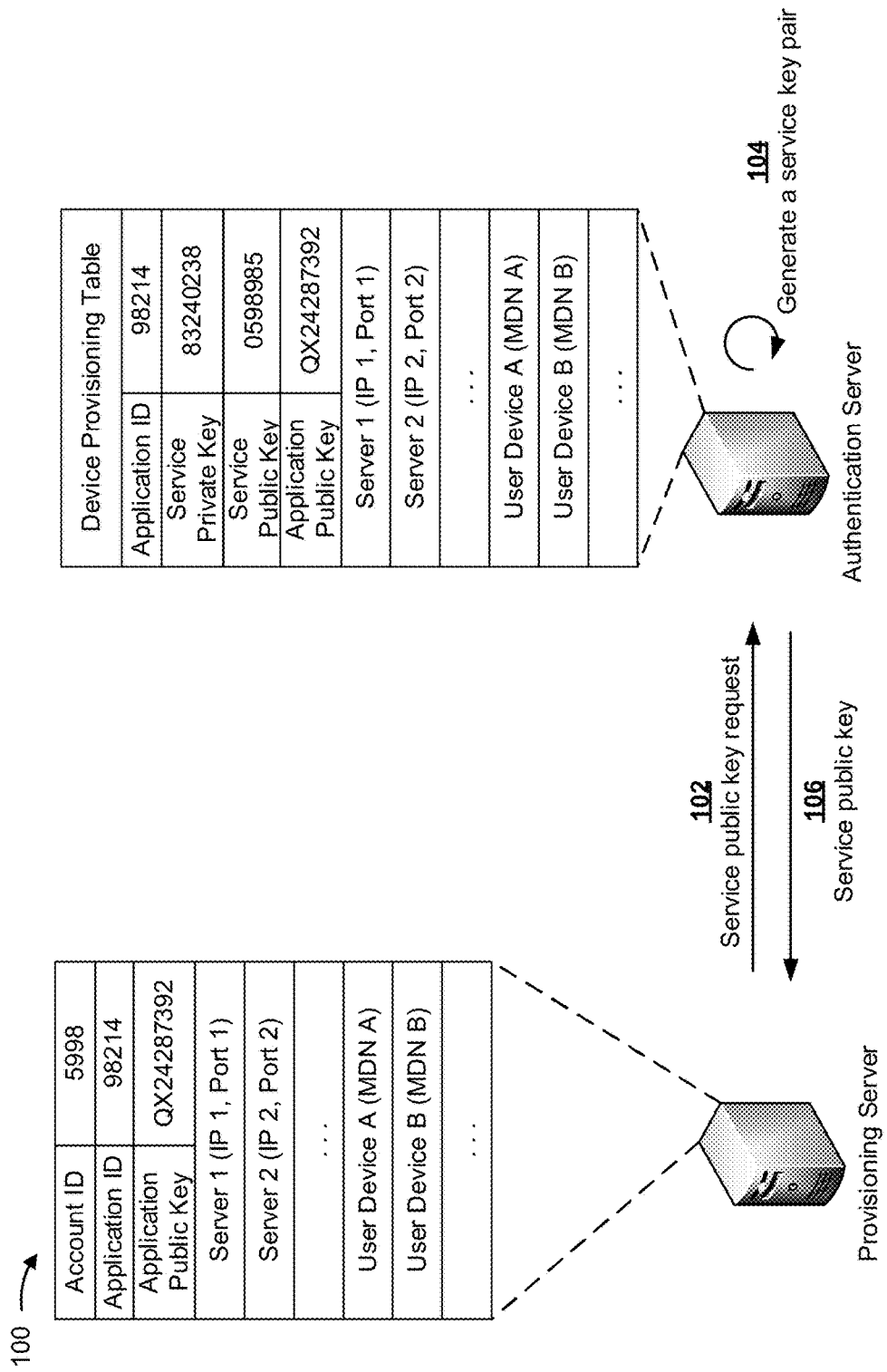
FIGS. 1A-1O are diagrams of an overview of an example implementation described herein.

The following detailed description of example implementations refers to the accompanying drawings. The same reference numbers in different drawings can identify the same or similar elements.

A client device can communicate with a platform server using Hypertext Transfer Protocol Secure (HTTPS) to establish a secure session. To do so, the client device and platform server might be required to perform mutual authentication using the Transport Layer Security (TLS) handshake protocol for authentication and key exchange. Before mutual authentication occurs, the client device and the platform server can perform a registration procedure. For example, the client device can register a certificate with the platform server, and the platform server can assign a unique device identifier to the client device.

In some cases, client device registration can prove tedious, cause scalability issues, and/or prove impractical. For example, in association with a content distribution platform, a large number (e.g., hundreds, thousands, millions, etc.) of client devices can receive content (e.g., video content, advertisement content, etc.) from platform servers, and provide the content for display. In such cases, each client device might be required to perform a registration procedure.

In some cases, a user might be required to manually configure each client device. For example, a user might, using a peripheral device, interact with a client device to enter an activation code and/or login credentials. In other cases, the client device can provide an activation code for display, and the user, using a different device (e.g., in cases where the client device does include peripheral device connectivity), can access a webpage and enter the activation code.

However, manually configuring each client device might not be practical or possible, such as in situations where the client device does include input peripheral connectivity, is located in an inaccessible location, and/or is mobile. For example, a client device can be associated with a display screen in a public venue (e.g., a restaurant, a store, a museum, a hotel, an airport, a club, a gas station, a motorway, a kiosk, etc.), a display screen associated with a vehicle (e.g., a taxi, an airplane, a boat, etc.), or the like. Additionally, such client devices are often configured to receive content via scheduled downloads and/or streaming over a wireless network, rather than being manually configured with the content.

Implementations described herein enable automatic and network-based authentication and/or registration of client devices by enabling a platform server (e.g., a content server) to authenticate and/or register a client device to receive content without requiring that a user manually interact with the client device (e.g., to input an authentication code, to enter some other credential, or the like).

When the client device performs an attach procedure in association with a wireless network (e.g., a radio access network (RAN)), core network devices can perform authentication to enable RAN and/or external network access. The platform server can utilize information associated with the network-performed authentication for a third party application (e.g., a content provisioning service).

In this way, implementations described herein reduce a need for manual configuration, improve security during the registration process (e.g., reduce counterfeiting), and improve scalability of content provisioning in multi-device content distribution platforms (e.g., where hundreds, thousands, millions, etc. of devices are to be registered to receive content).

FIGS. 1A-1O are diagrams of an overview of an example implementation 100 described herein. As shown in FIG. 1A, example implementation 100 can include a provisioning server and an authentication server. In some implementations, the provisioning server can provide, to the authentication server, information associated with an application that is to be used in association with a content provisioning service. For example, a set of user devices can execute client applications (e.g., content provisioning applications) that enable the user devices to receive content (e.g., video content, advertisement content, image content, etc.) from a set of content servers, and provide the content for display. The authentication server can enable a registration service whereby the authentication server can provide, to the set of content servers, authentication and/or registration information which enables the set of content servers to authenticate and/or register a set of user devices to receive content.

As shown in FIG. 1A, and by reference number 102, the provisioning server can provide, to the authentication server, a service public key request (e.g., a request for a service key to be used in association with the registration service). The service public key request can include information that identifies an application identifier (e.g., associated with the content provisioning application), information that identifies a set of user devices (e.g., mobile directory numbers (MDNs), International Mobile Equipment Identities (IMEIs), International Mobile Subscriber Identities (IMSIs), or the like), information that identifies a set of content servers (e.g., Internet Protocol (IP) addresses, Media Access Control (MAC) addresses, port identifiers, or the like), and information that identifies an application certificate.

As further shown in FIG. 1A, and by reference number 104, the authentication server can generate a service key pair (e.g., a service public key and a service private key) based on the service public key request. As shown, the authentication server can store, in a data structure (e.g., a device provisioning table), information associated with the content provisioning service and the registration service. That is, the authentication server can store information that identifies the content provisioning application, information associated with service keys and applications keys, and information that identifies the user devices and content servers that are associated with the content provisioning service (e.g., are eligible to use the content provisioning service). As further shown in FIG. 1A, and by reference number 106, the authentication server can provide, to the provisioning server, information that identifies the service public key.

Figure 1B:
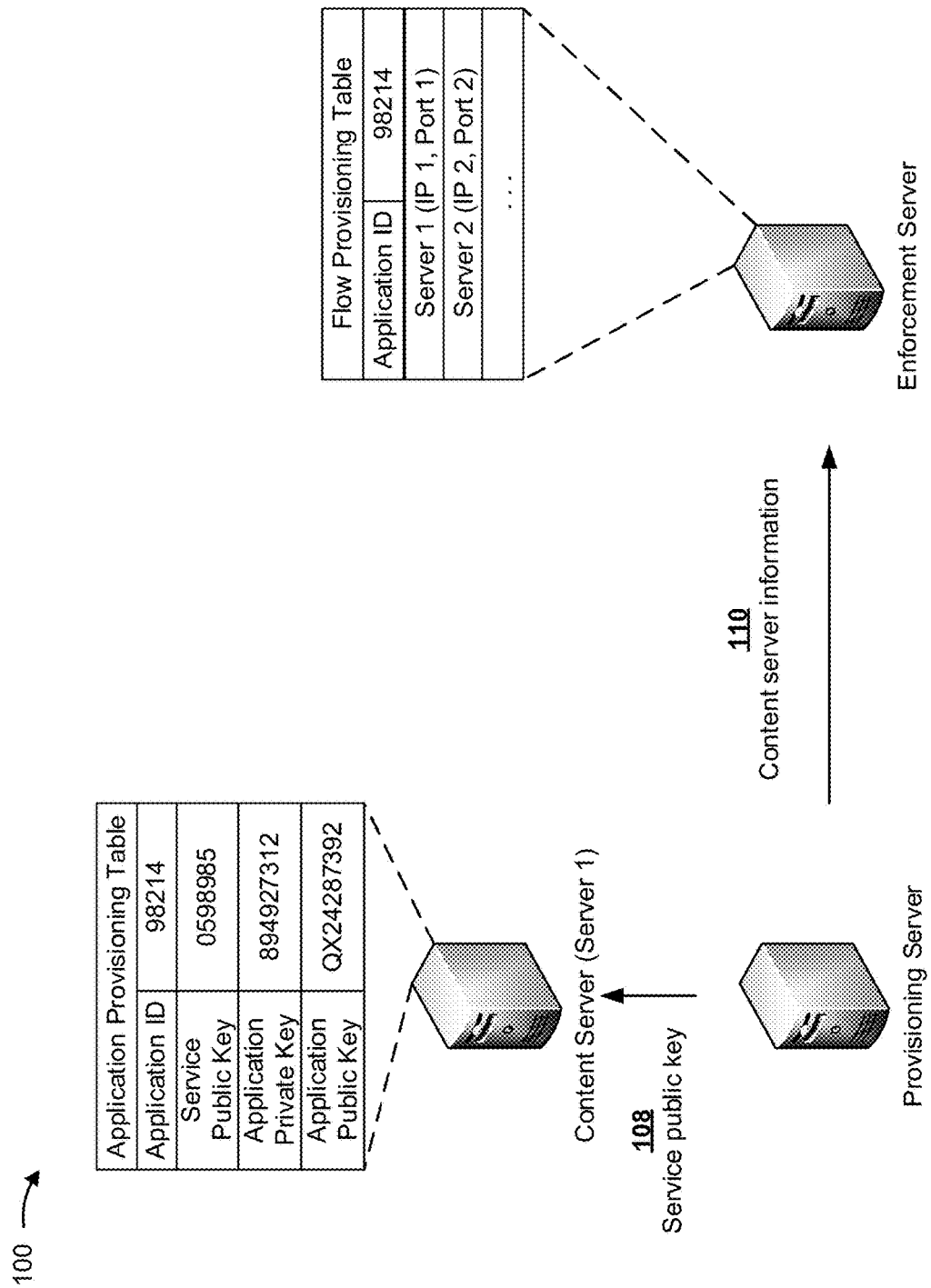

As shown in FIG. 1B, example implementation 100 can further include a content server and an enforcement server. As shown in FIG. 1B, and by reference number 108, the provisioning server can provide, to the content server, information that identifies the service public key. As further shown in FIG. 1B, and by reference number 110, the provisioning server can provide, to the enforcement server, content server information. For example, the content server information can include information that identifies the content servers that are associated with the content provisioning service, and information that identifies the content provisioning application. The enforcement server can store, in a data structure (e.g., a flow provisioning table), the content server information.

Figure 1C:
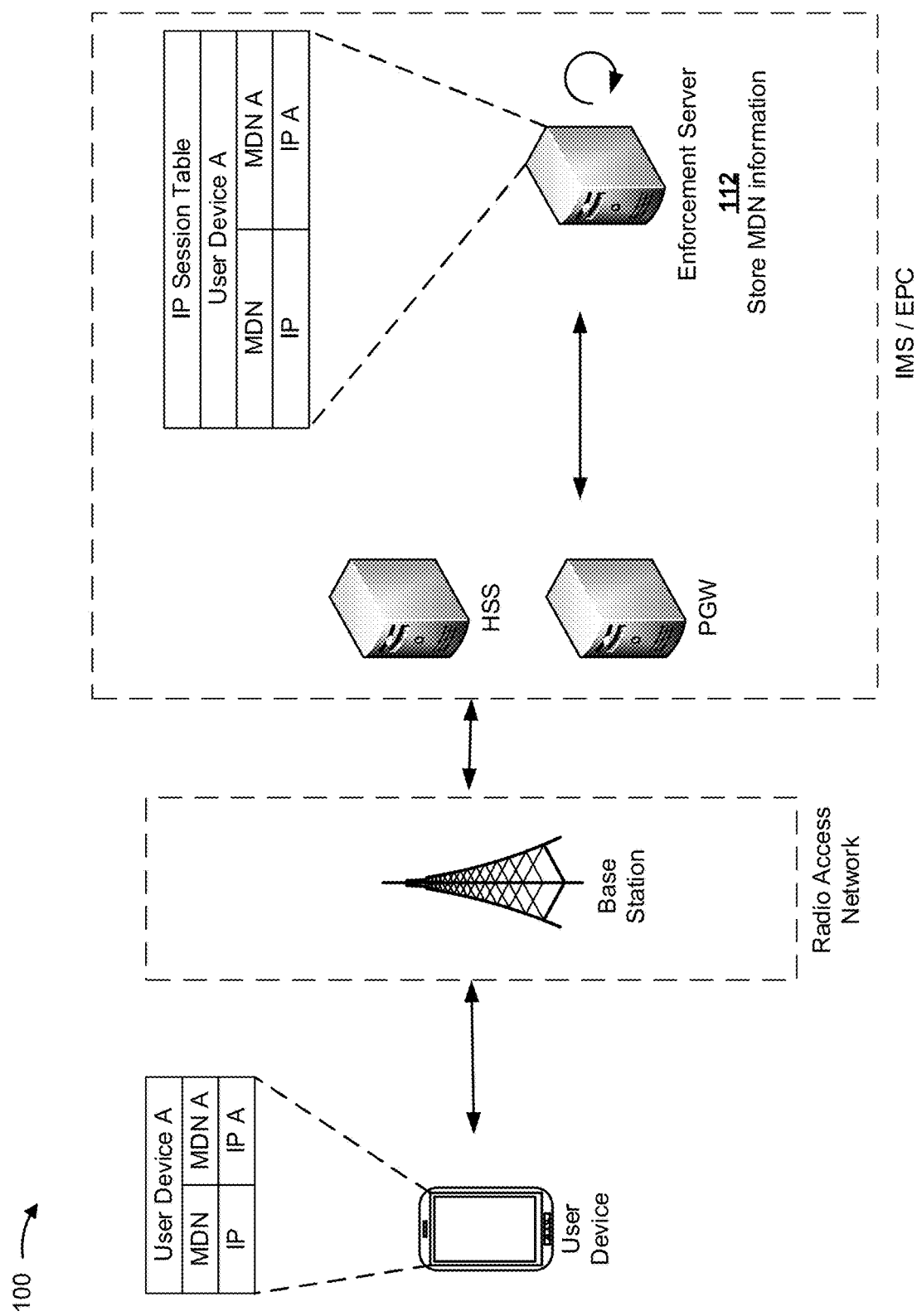

As shown in FIG. 1C, example implementation 100 can further include a user device, a radio access network (RAN) including a base station, and an IP multimedia system (IMS) core and an evolved packet core (EPC) that include a home subscriber server (HSS), a packet data network gateway (PGW), and the enforcement server. In some implementations, the user device can perform an attach procedure based on accessing the RAN. Additionally, or alternatively, the HSS can perform an authentication procedure based on the user device accessing the RAN. Still further, the PGW can establish an IP session for the user device based on the authentication procedure.

As further shown in FIG. 1C, and by reference number 112, the enforcement server can store MDN information. For example, the enforcement server can receive information associated with the IP session of the user device, and store the information that identifies the user device (e.g., an MDN) in a data structure (e.g., an IP session table). That is, the enforcement server can receive, from a network device (e.g., the HSS and/or PGW), information that identifies that the user device has been authenticated by one or more network devices associated with the IMS and/or EPC.

Figure 1D:
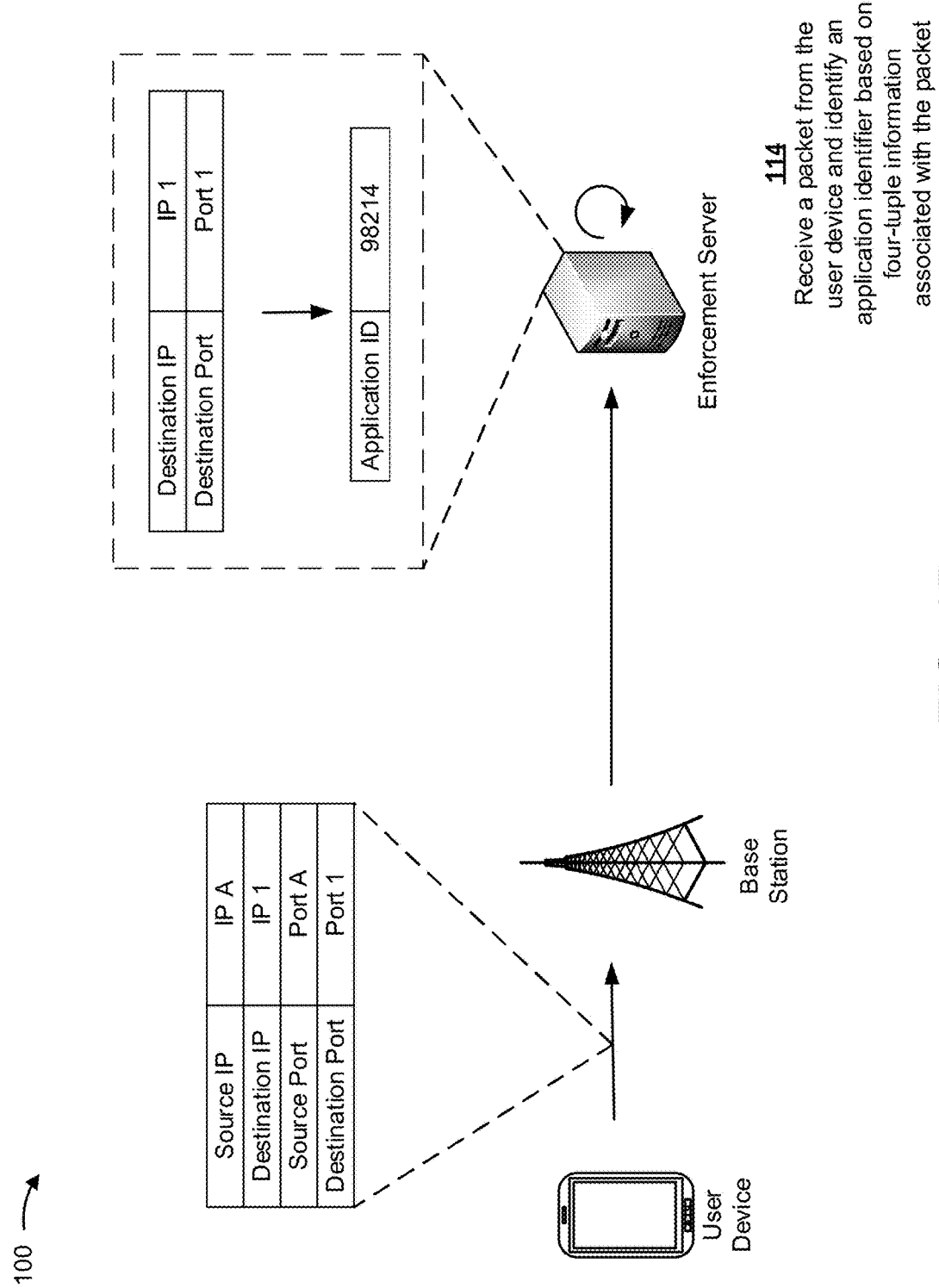

As shown in FIG. 1D, and by reference number 114, the enforcement server can receive a packet from the user device, and can identify an application identifier based on four-tuple information associated with the packet. For example, the enforcement server can parse the packet and identify four-tuple information, such as a source IP address, a destination IP address, a source port identifier, and a destination port identifier. Additionally, the enforcement server can search a data structure (e.g., the flow provisioning table) using the four-tuple information, and identify an application identifier based on an entry associated with the data structure.

Figure 1E:
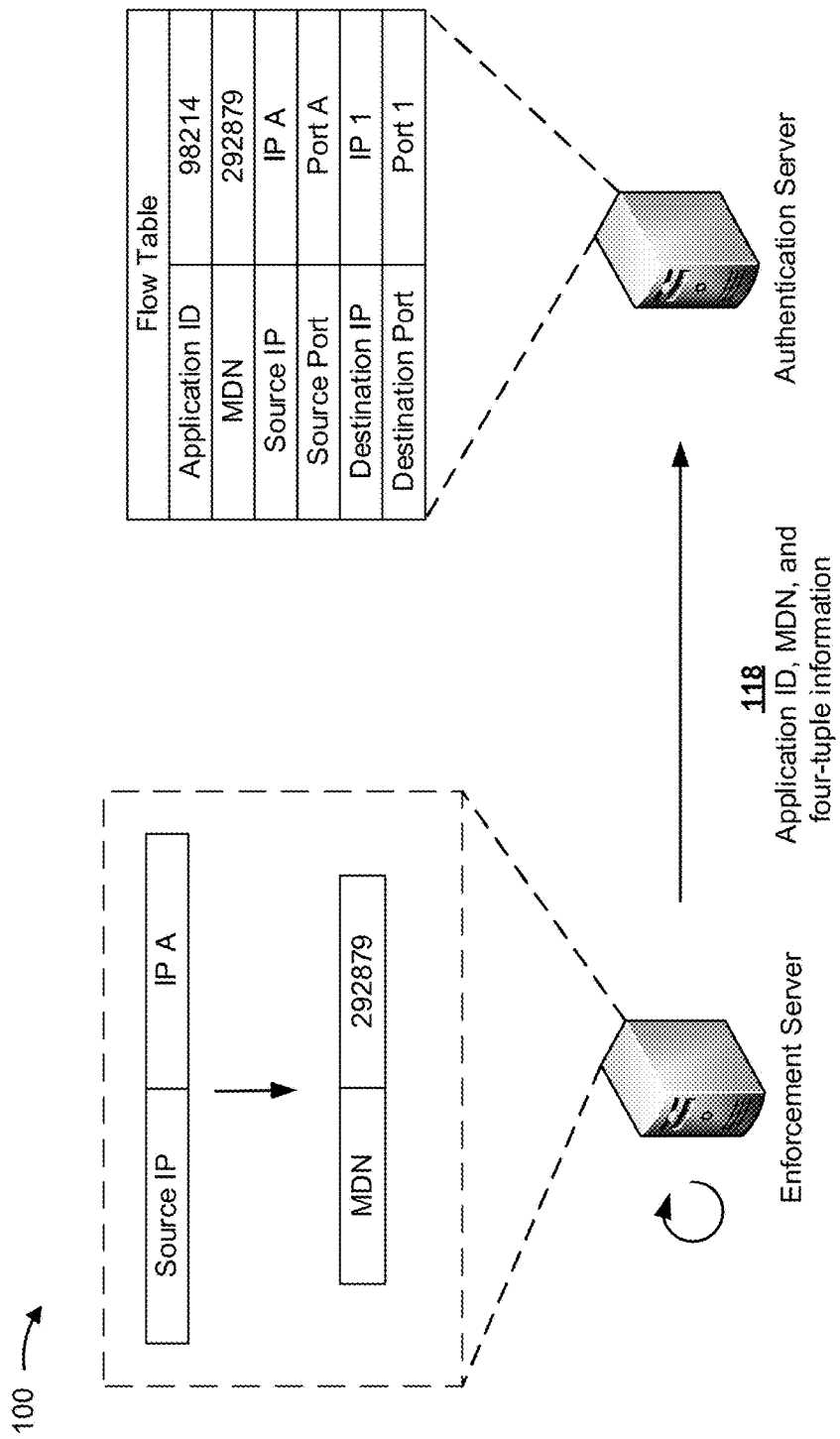

As shown in FIG. 1E, and by reference number 116, the enforcement server can identify an MDN of the user device. For example, the enforcement server can search a data structure (e.g., the IP session table) using the four-tuple information associated with the packet, and identify an MDN of the user device. In this way, the enforcement server can determine that an IP session, associated with the user device, has not expired, and/or that one or more network devices have authenticated the user device (e.g., to enable access to the RAN and/or external packet networks).

As further shown in FIG. 1E, and by reference number 118, the enforcement server can provide, to the authentication server, information that identifies the application identifier, the MDN of the user device, and the four-tuple information. The authentication server can store, in a data structure (e.g., a flow table), information that identifies the application identifier, the MDN of the user device, and the four-tuple information.

Figure 1F:
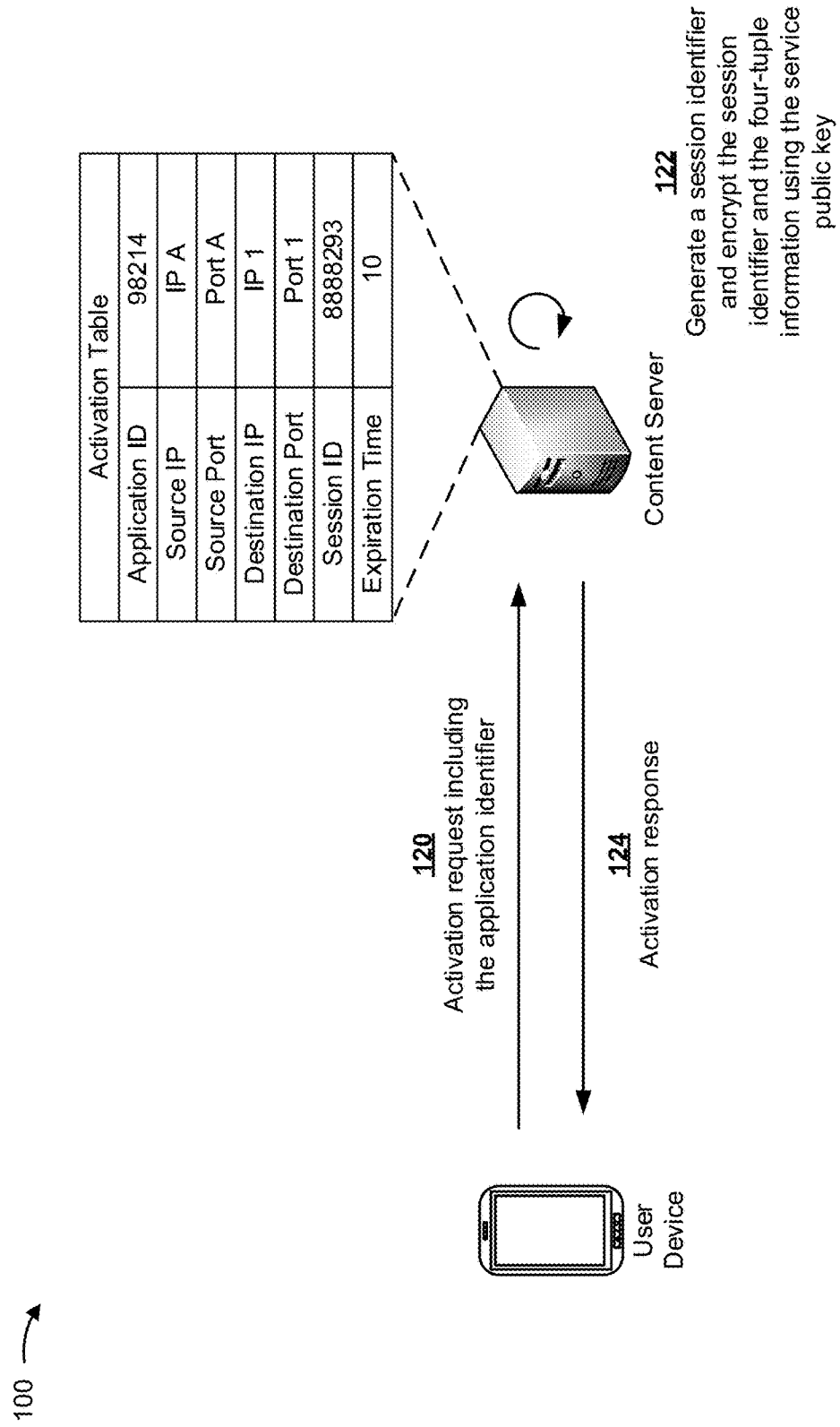

As shown in FIG. 1F, and by reference number 120, the user device can provide, to the content server, an activation request including the application identifier. As further shown in FIG. 1F, and by reference number 122, the content server can generate a session identifier and encrypt the session identifier and the four-tuple information using the service public key. Additionally, the content server can store, in a data structure (e.g., an activation table), information that identifies the application identifier, the four-tuple information, the session identifier, and an expiration time associated with the session identifier (e.g., a time frame for which the session identifier is valid). As further shown in FIG. 1F, the content server can provide, to the user device, an activation response that includes information that identifies the application identifier and the encrypted session identifier and four-tuple information.

As shown in FIG. 1G, and by reference number 126, the user device can provide, to the authentication server, a token request including information that identifies the application identifier and the encrypted session identifier and four-tuple information. As further shown in FIG. 1G, and by reference number 128, the authentication server can search a data structure (e.g., the device provisioning table), and identify a service private key and an application public key based on the token request.

Figure 1H:
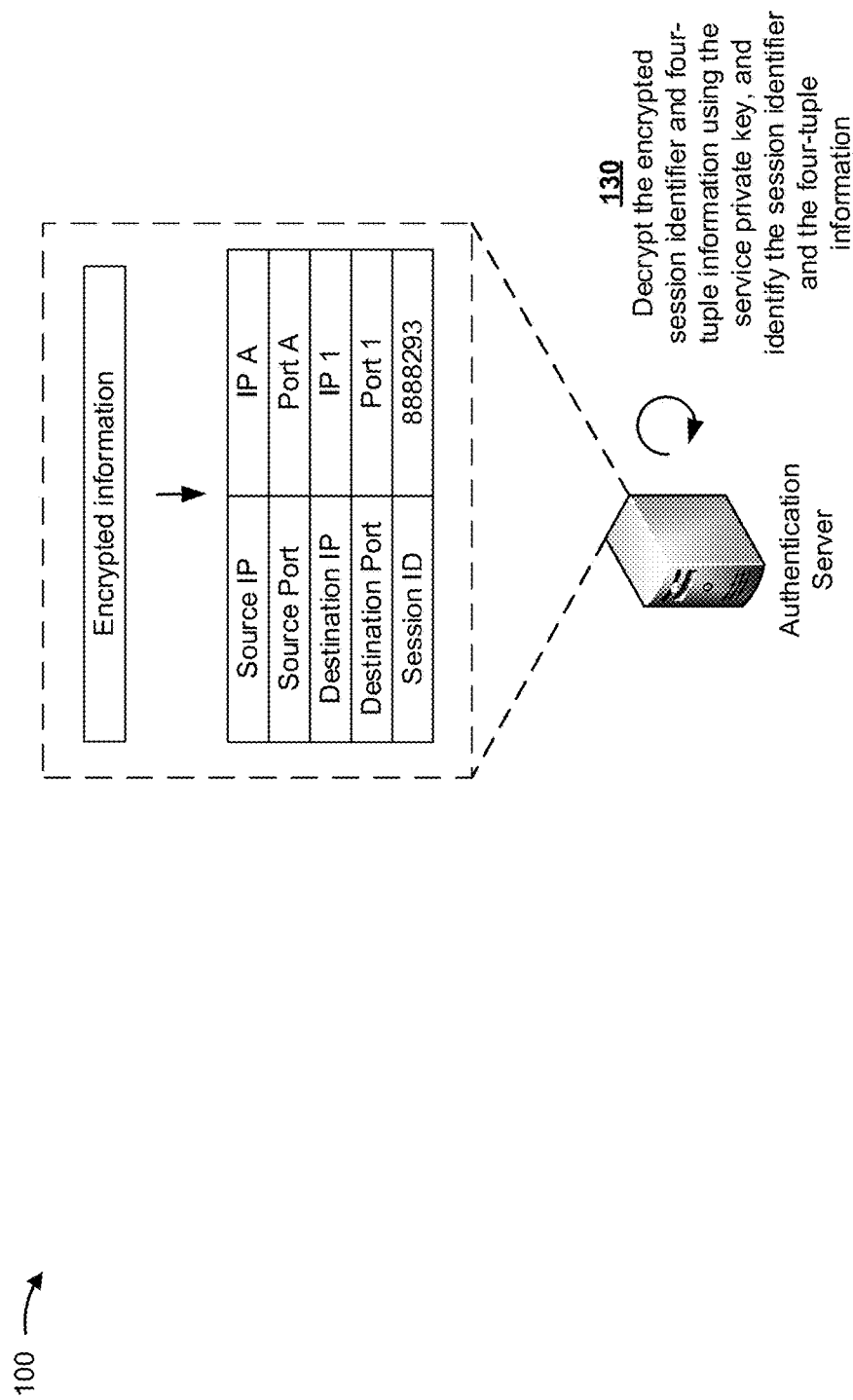

As shown in FIG. 1H, and by reference number 130, the authentication server can decrypt the encrypted session identifier and four-tuple information using the service private key, and can identify the session identifier and the four-tuple information.

Figure 1I:
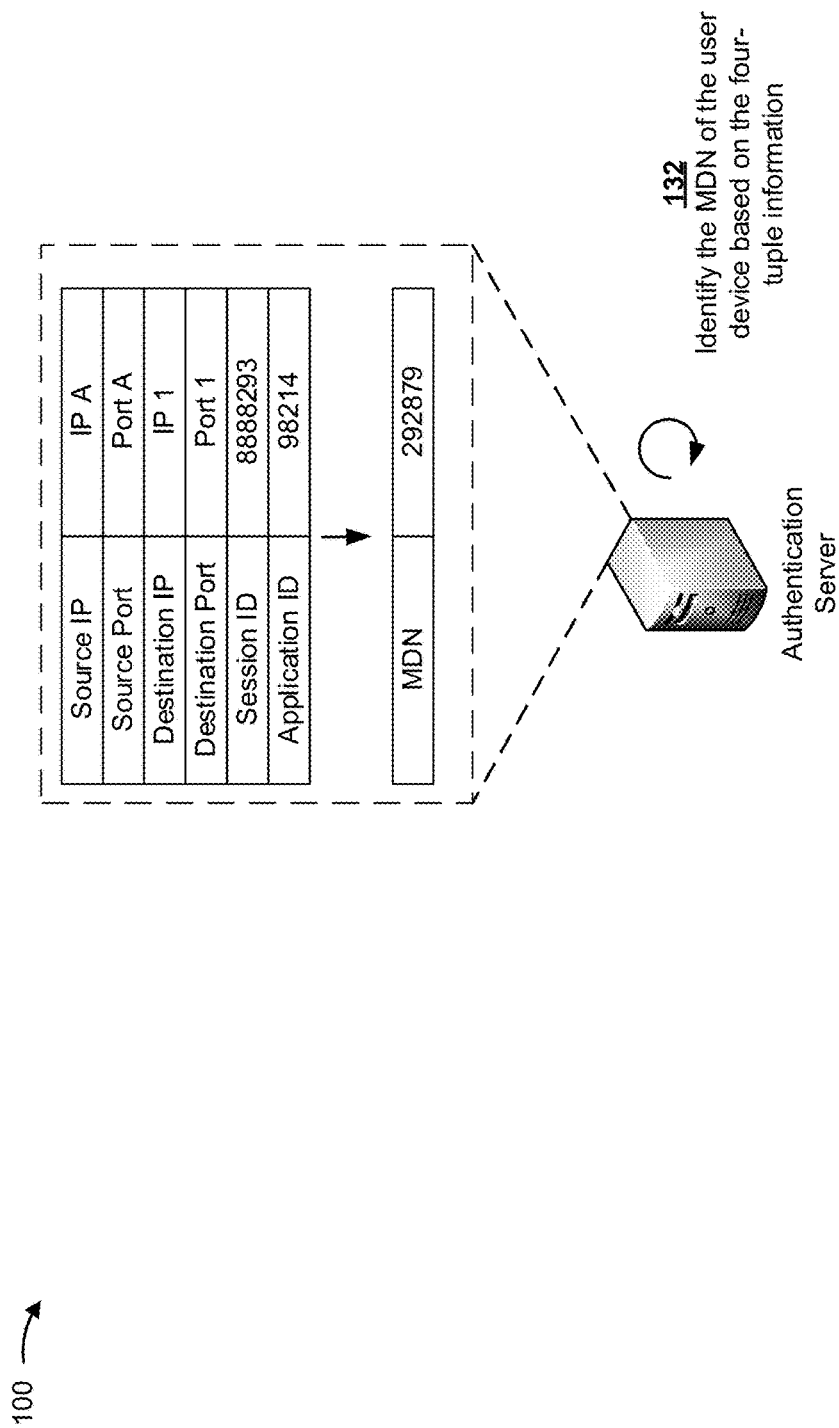

As shown in FIG. 1I, and by reference number 132, the authentication server can identify the MDN of the user device based on the four-tuple information. For example, the authentication server can search a data structure (e.g., the flow table) using the application identifier and the four-tuple information, and identify the MDN of the user device.

Figure 1J:
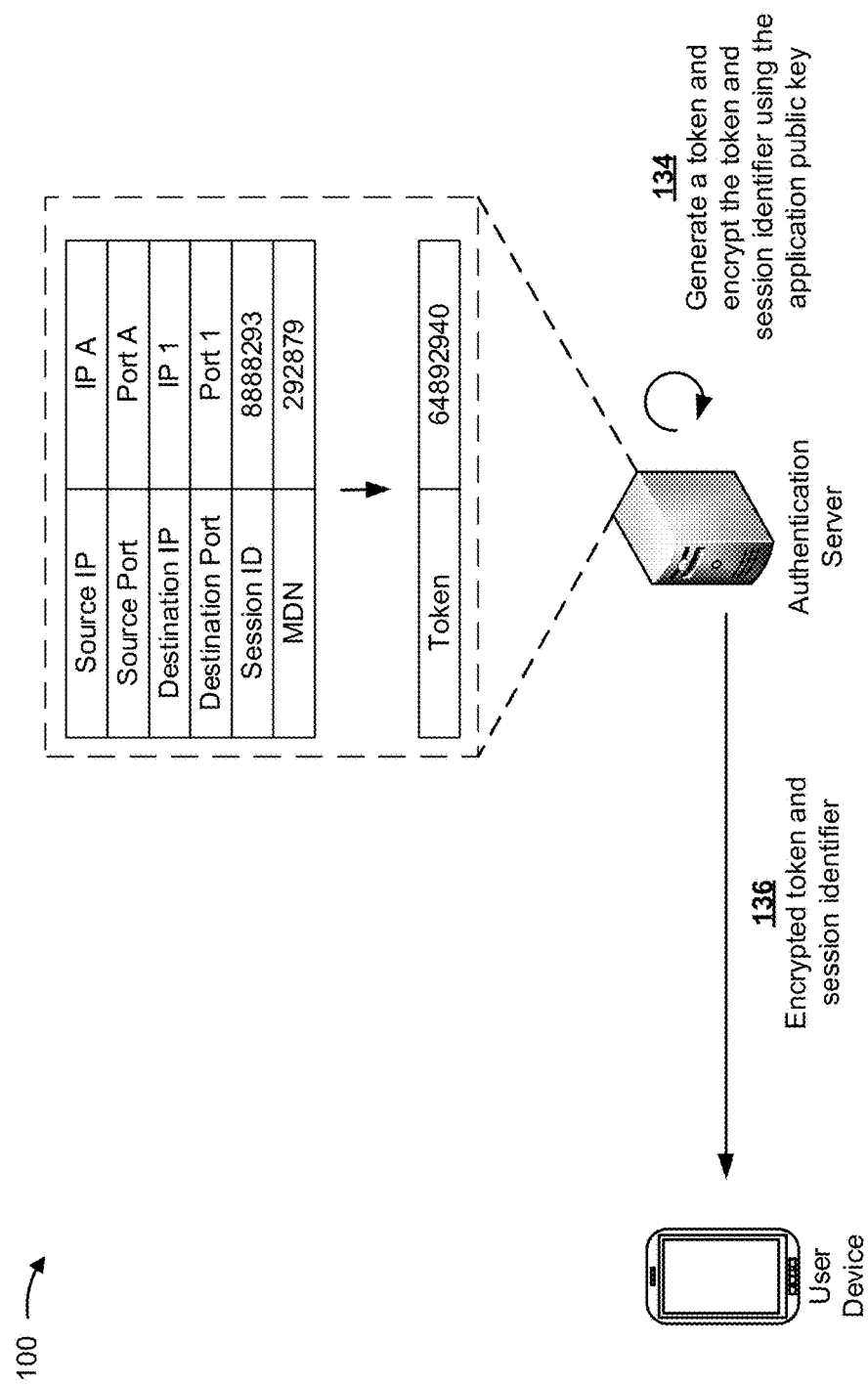

As shown in FIG. 1J, and by reference number 134, the authentication server can generate a token and can encrypt the token and the session identifier using the application public key. For example, the authentication server can generate the token using a hashing algorithm, the application identifier, the session identifier, the MDN of the user device, and the four-tuple information. As further shown in FIG. 1J, and by reference number 136, the authentication server can provide, to the user device, the encrypted token and session identifier.

Figure 1K:
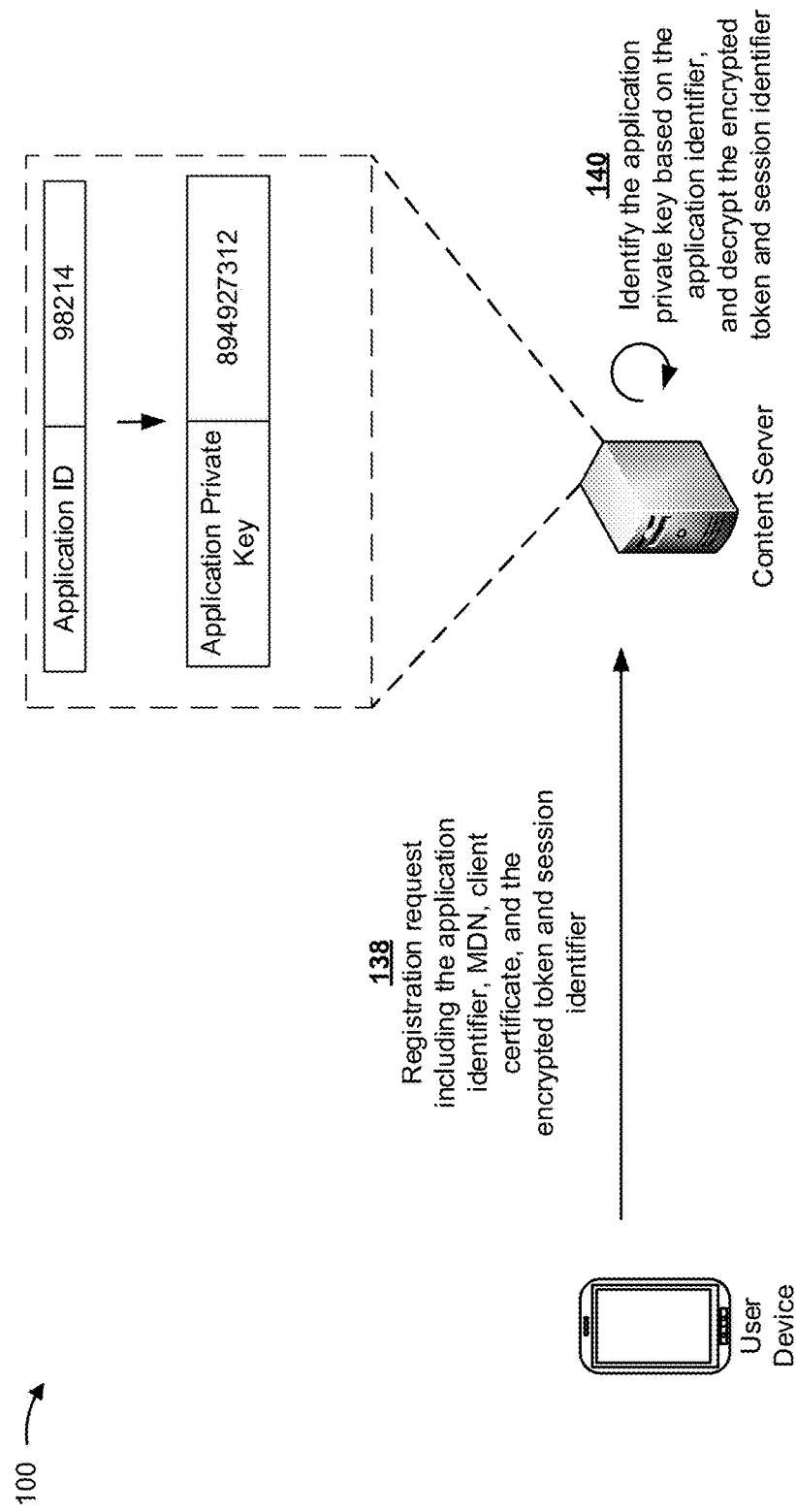

As shown in FIG. 1K, and by reference number 138, the user device can provide, to the content server, a registration request including information that identifies the application identifier, the MDN of the user device, a client certificate, and the encrypted token and session identifier. As further shown in FIG. 1K, and by reference number 140, the content server can identify the application private key based on the application identifier, and decrypt the encrypted token and session identifier.

Figure 1L:
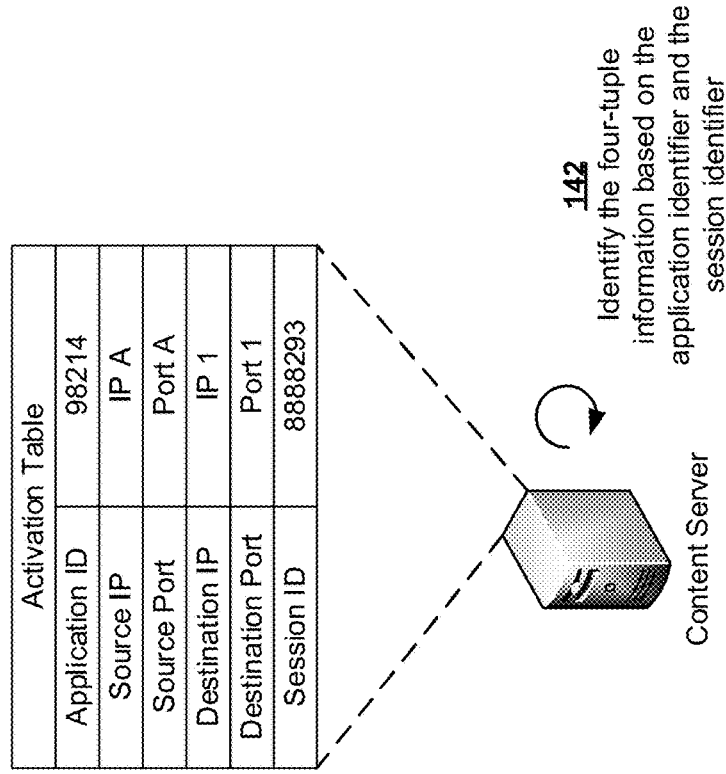

As shown in FIG. 1L, and by reference number 142, the content server can identify the four-tuple information based on the application identifier and the session identifier. For example, the content server can search a data structure (e.g., the activation table) using the application identifier and the session identifier, and identify an entry that includes the four-tuple information.

Figure 1M:
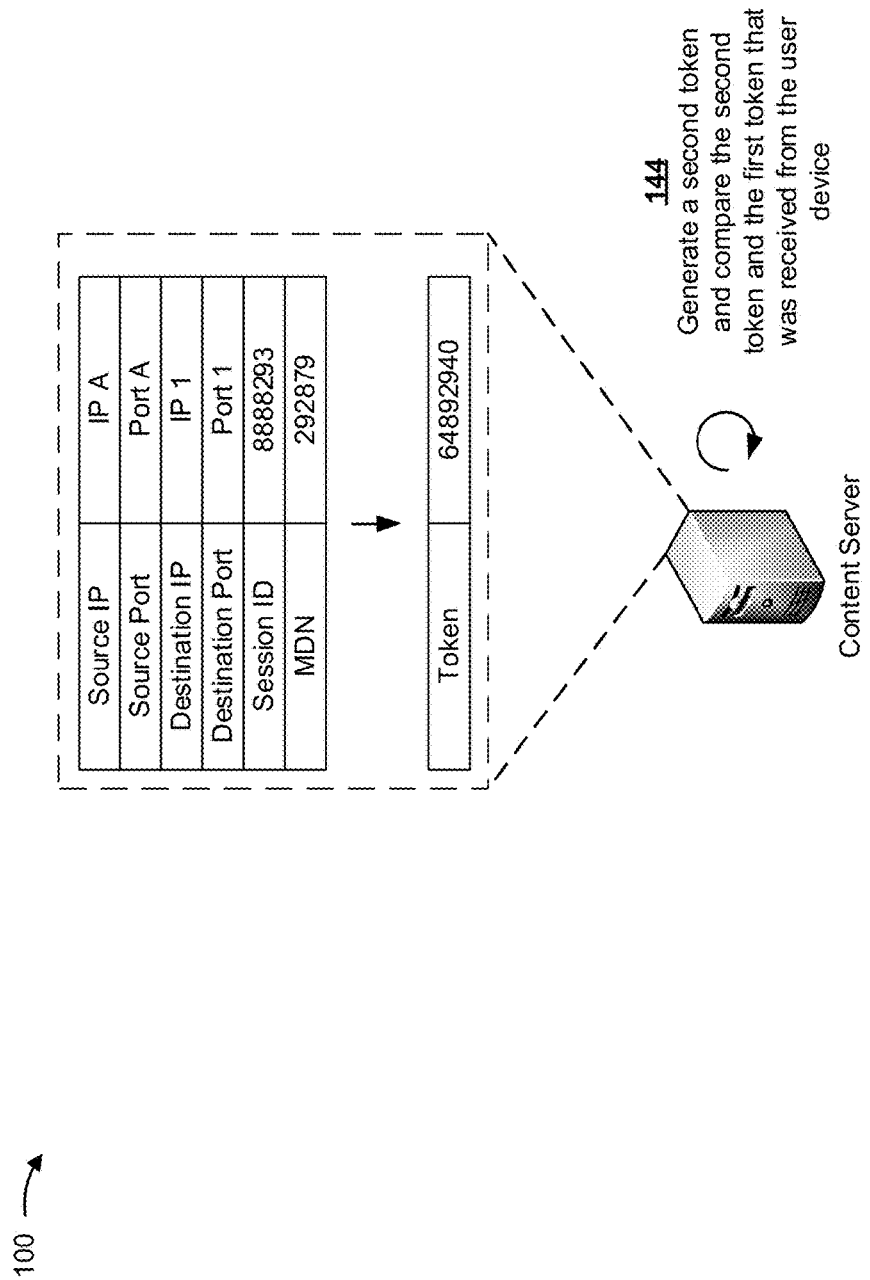
Figure 10:
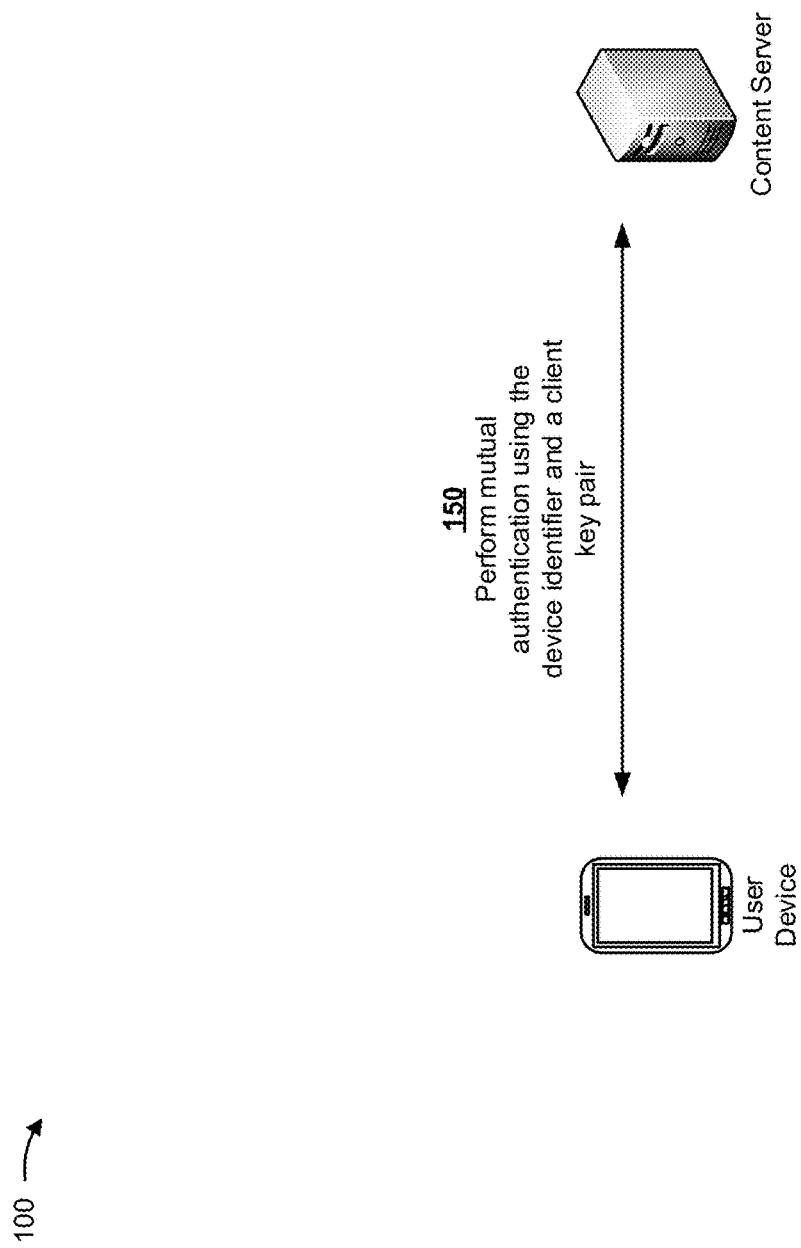

As shown in FIG. 1M, and by reference number 144, the content server can generate a second token and compare the second token and the first token that was received from the user device. For example, the content server can generate the second token using the application identifier, the session identifier, the MDN of the user device, and the four-tuple information. Additionally, the content server can compare the second token and the first token that was generated by the authentication server and provided by the user device. As an example, the content server can determine that the second token is the same as the first token that was received from the user device. In this way, the content server can determine that the user device was authenticated by one or more network devices (e.g., because the first token and the second token match).

As shown in FIG. 1N, and by reference number 146, the content server can generate a device identifier for the user device and store user device information. For example, the content server can store, in a data structure (e.g., a device table), information that identifies the user device and information that identifies a status of the user device (e.g., registered). As further shown in FIG. 1N, and by reference number 148, the content server can provide the device identifier to the user device.

As shown in FIG. 1O, and by reference number 150, the user device and the content server can perform mutual authentication using the device identifier and a client key pair. In this way, example implementation 100 enables automatic authentication of the user device based on network-based authentication information.

In this way, implementations described herein reduce a need for manual configuration, improve security during the registration process, and improve scalability of content provisioning in multi-device content distribution platforms (e.g., where hundreds, thousands, millions, etc. of devices are to be registered to receive content).

As indicated above, FIGS. 1A-1O are provided merely as an example. Other examples are possible and can differ from what was described with regard to FIGS. 1A-1O.

Figure 2:
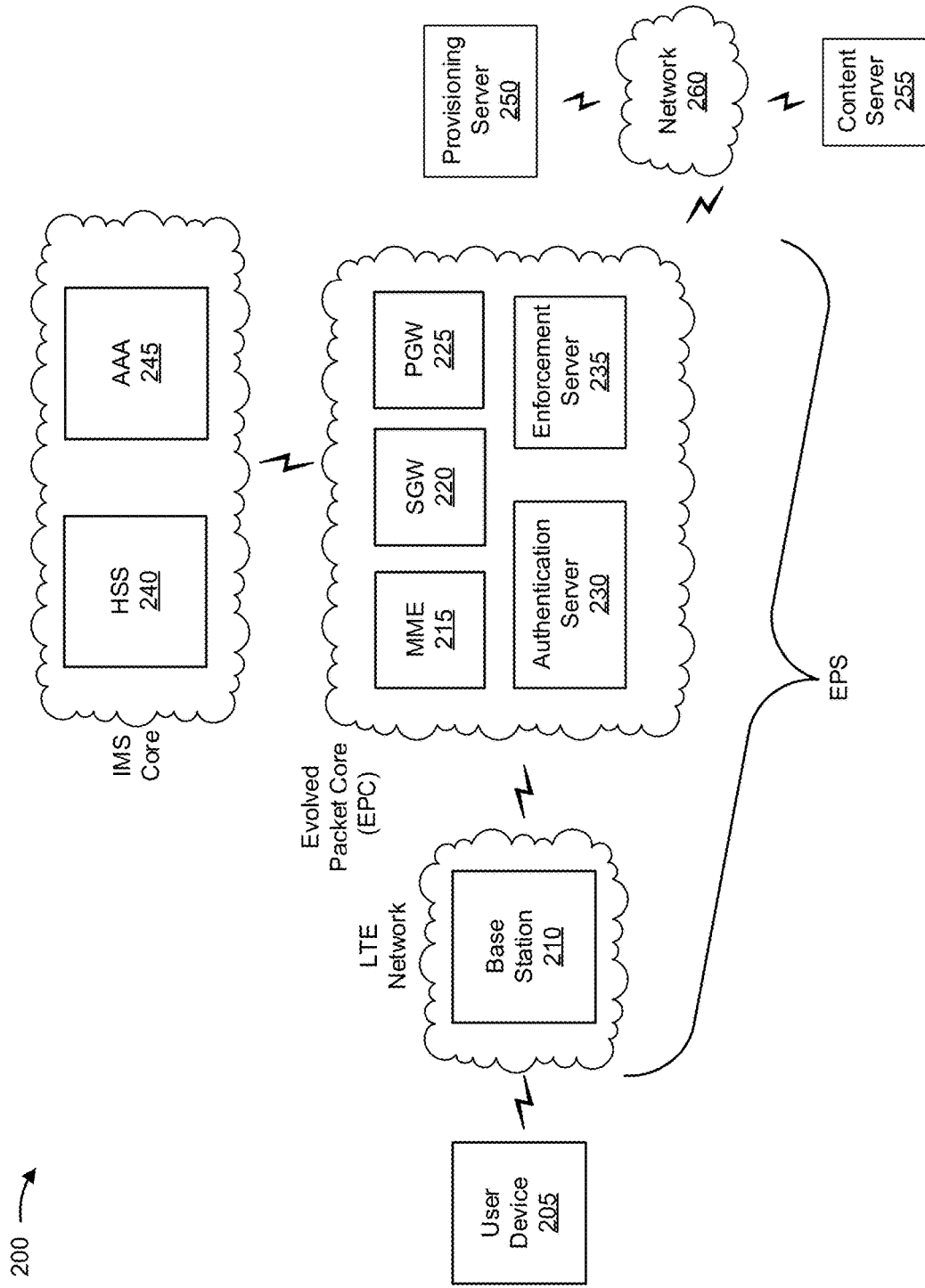
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a user device 205, a base station 210, a mobility management entity device (MME) 215, a serving gateway (SGW) 220, a packet data network gateway (PGW) 225, an authentication server 230, an enforcement server 235, a home subscriber server (HSS) 240, an authentication, authorization, and accounting server (AAA) 245, a provisioning server 250, a content server 255, and a network 260. Devices of environment 200 can interconnect via wired connections, wireless connections, or a combination of wired and wireless connections.

Some implementations are described herein as being performed within a long term evolution (LTE) network for explanatory purposes. Some implementations can be performed within a network that is not an LTE network, such as a fifth generation (5G) network or a third generation (3G) network.

Environment 200 includes an evolved packet system (EPS) that includes an LTE network and/or an evolved packet core (EPC) that operate based on a third generation partnership project (3GPP) wireless communication standard. The LTE network includes a radio access network (RAN) that includes one or more base stations 210 that take the form of evolved Node Bs (eNBs) via which user device 205 communicates with the EPC. The EPC can include MME 215, SGW 220, and/or PGW 225 that enable user device 205 to communicate with network 260 and/or an Internet protocol (IP) multimedia subsystem (IMS) core. The IMS core can include HSS 240 and/or AAA 245, and can manage device registration and authentication, session initiation, etc., associated with user devices 205. HSS 240 and/or AAA 245 can reside in the EPC and/or the IMS core.

User device 205 includes one or more devices capable of communicating with base station 210 and/or a network (e.g., network 260). For example, user device 205 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, and/or a similar device. In some implementations, user device 205 includes one or more machine-to-machine (M2M) devices and/or one or more Internet of Things (IoT) devices (e.g., any "thing" in the IoT). User device 205 can send traffic to and/or receive traffic from network 260 (e.g., via base station 210, SGW 220, and/or PGW 225).

Base station 210 includes one or more devices capable of transferring traffic, such as audio, video, text, and/or other traffic, destined for and/or received from user device 205. In some implementations, base station 210 can include an eNB associated with the LTE network that receives traffic from and/or sends traffic to network 260 via SGW 220 and/or PGW 225. Additionally, or alternatively, one or more base stations 210 can be associated with a RAN that is not associated with the LTE network. Base station 210 can send traffic to and/or receive traffic from user device 205 via an air interface. In some implementations, base station 210 can include a small cell base station, such as a base station of a microcell, a picocell, and/or a femtocell.

MME 215 includes one or more devices, such as one or more server devices, capable of managing authentication, activation, deactivation, and/or mobility functions associated with user device 205. In some implementations, MME 215 can perform operations relating to authentication of user device 205. Additionally, or alternatively, MME 215 can facilitate the selection of a particular SGW 220 and/or a particular PGW 225 to serve traffic to and/or from user device 205. MME 215 can perform operations associated with handing off user device 205 from a first base station 210 to a second base station 210 when user device 205 is transitioning from a first cell associated with the first base station 210 to a second cell associated with the second base station 210. Additionally, or alternatively, MME 215 can select another MME (not pictured), to which user device 205 should be handed off (e.g., when user device 205 moves out of range of MME 215).

SGW 220 includes one or more devices capable of routing packets. For example, SGW 220 can include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 can aggregate traffic received from one or more base stations 210 associated with the LTE network, and can send the aggregated traffic to network 260 (e.g., via PGW 225) and/or other network devices associated with the EPC and/or the IMS core. SGW 220 can also receive traffic from network 260 and/or other network devices, and can send the received traffic to user device 205 via base station 210. Additionally, or alternatively, SGW 220 can perform operations associated with handing off user device 205 to and/or from an LTE network.

PGW 225 includes one or more devices capable of providing connectivity for user device 205 to external packet data networks (e.g., other than the depicted EPC and/or LTE network). For example, PGW 225 can include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 can aggregate traffic received from one or more SGWs 220, and can send the aggregated traffic to network 260. Additionally, or alternatively, PGW 225 can receive traffic from network 260, and can send the traffic to user device 205 via SGW 220 and base station 210. PGW 225 can record data usage information (e.g., byte usage), and can provide the data usage information to AAA 245.

Authentication server 230 includes one or more devices capable of receiving, processing, storing, generating, and/or providing information associated with a registration service. For example, authentication server 230 can include a server device (e.g., a host server, a web server, an application server, etc.), a cloud computing device, or a similar device.

Enforcement server 235 includes one or more devices capable of receiving, processing, storing, generating, and/or providing information associated with a registration service. For example, enforcement server 235 can include a server device (e.g., a host server, a web server, an application server, etc.), a cloud computing device, or a similar device.

HSS 240 includes one or more devices, such as one or more server devices, capable of managing (e.g., receiving, generating, storing, processing, and/or providing) information associated with user device 205. For example, HSS 240 can manage subscription information associated with user device 205, such as information that identifies a subscriber profile of a user associated with user device 205, information that identifies services and/or applications that are accessible to user device 205, location information associated with user device 205, a network identifier (e.g., a network address) that identifies user device 205, information that identifies a treatment of user device 205 (e.g., quality of service information, a quantity of minutes allowed per time period, a quantity of data consumption allowed per time period, etc.), and/or similar information. HSS 240 can provide this information to one or more other devices of environment 200 to support the operations performed by those devices.

AAA 245 includes one or more devices, such as one or more server devices, that perform authentication, authorization, and/or accounting operations for communication sessions associated with user device 205. For example, AAA 245 can perform authentication operations for user device 205 and/or a user of user device 205 (e.g., using one or more credentials), can control access, by user device 205, to a service and/or an application (e.g., based on one or more restrictions, such as time-of-day restrictions, location restrictions, single or multiple access restrictions, read/write restrictions, etc.), can track resources consumed by user device 205 (e.g., a quantity of voice minutes consumed, a quantity of data consumed, etc.), and/or can perform similar operations.

Provisioning server 250 includes one or more devices capable of receiving, processing, storing, generating, and/or providing information associated with a content provisioning service and/or a registration service. For example, provisioning server 250 can include a server device (e.g., a host server, a web server, an application server, etc.), a cloud computing device, or a similar device.

Content server 255 includes one or more devices capable of receiving, generating, storing, processing, and/or providing information associated with a content provisioning service. For example, content server 255 can include a server device (e.g., a host server, a web server, an application server, etc.), a data center device, or a similar device.

Network 260 includes one or more wired and/or wireless networks. For example, network 260 can include a cellular network (e.g., a 5G network, an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
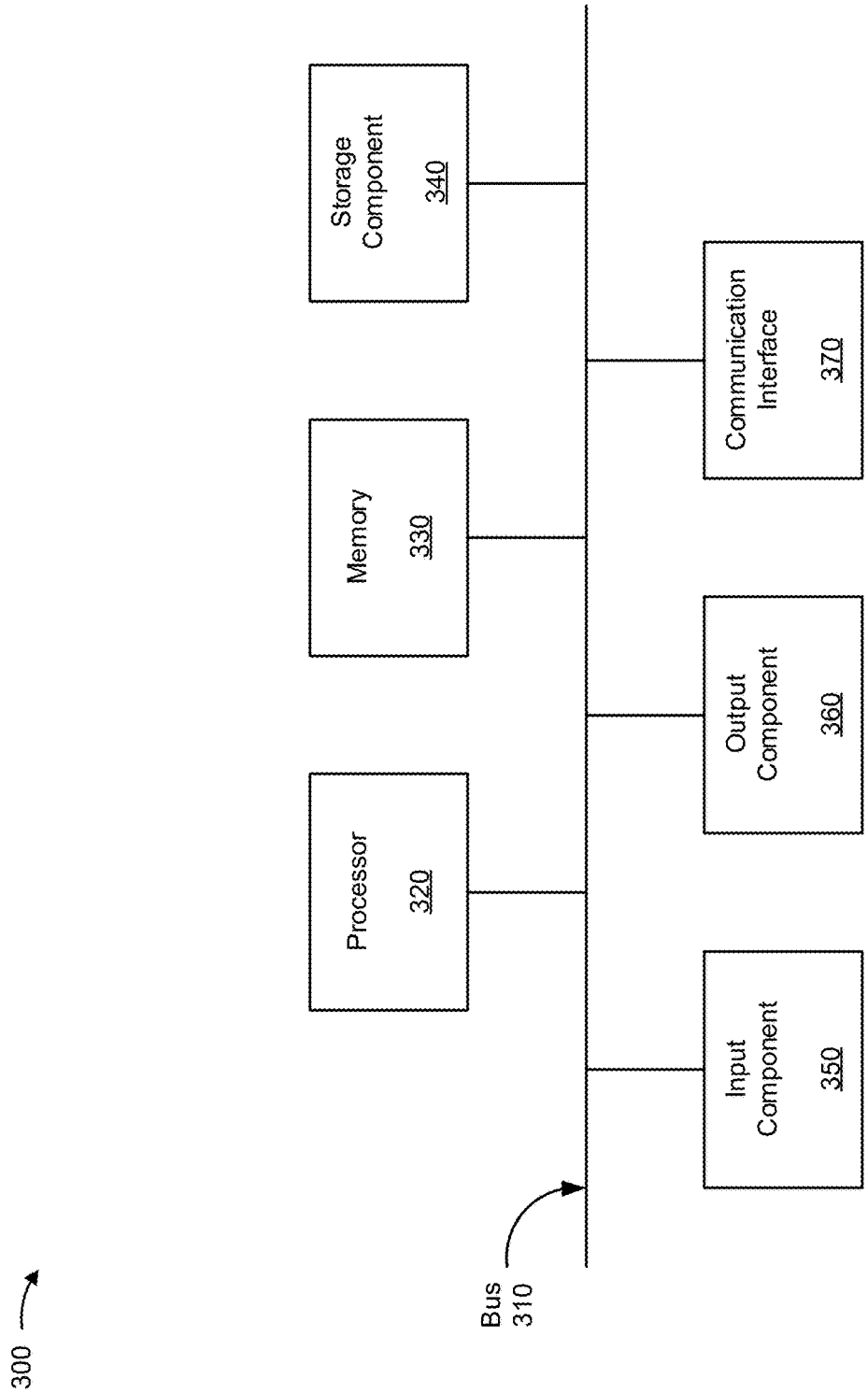
FIG. 3 is a diagram of example components of one or more devices of FIG. 2.

FIG. 3 is a diagram of example components of a device 300. Device 300 can correspond to user device 205, base station 210, MME 215, SGW 220, PGW 225, authentication server 230, enforcement server 235, HSS 240, AAA 245, provisioning server 250, and/or content server 255. In some implementations, user device 205, base station 210, MME 215, SGW 220, PGW 225, authentication server 230, enforcement server 235, HSS 240, AAA 245, provisioning server 250, and/or content server 255 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
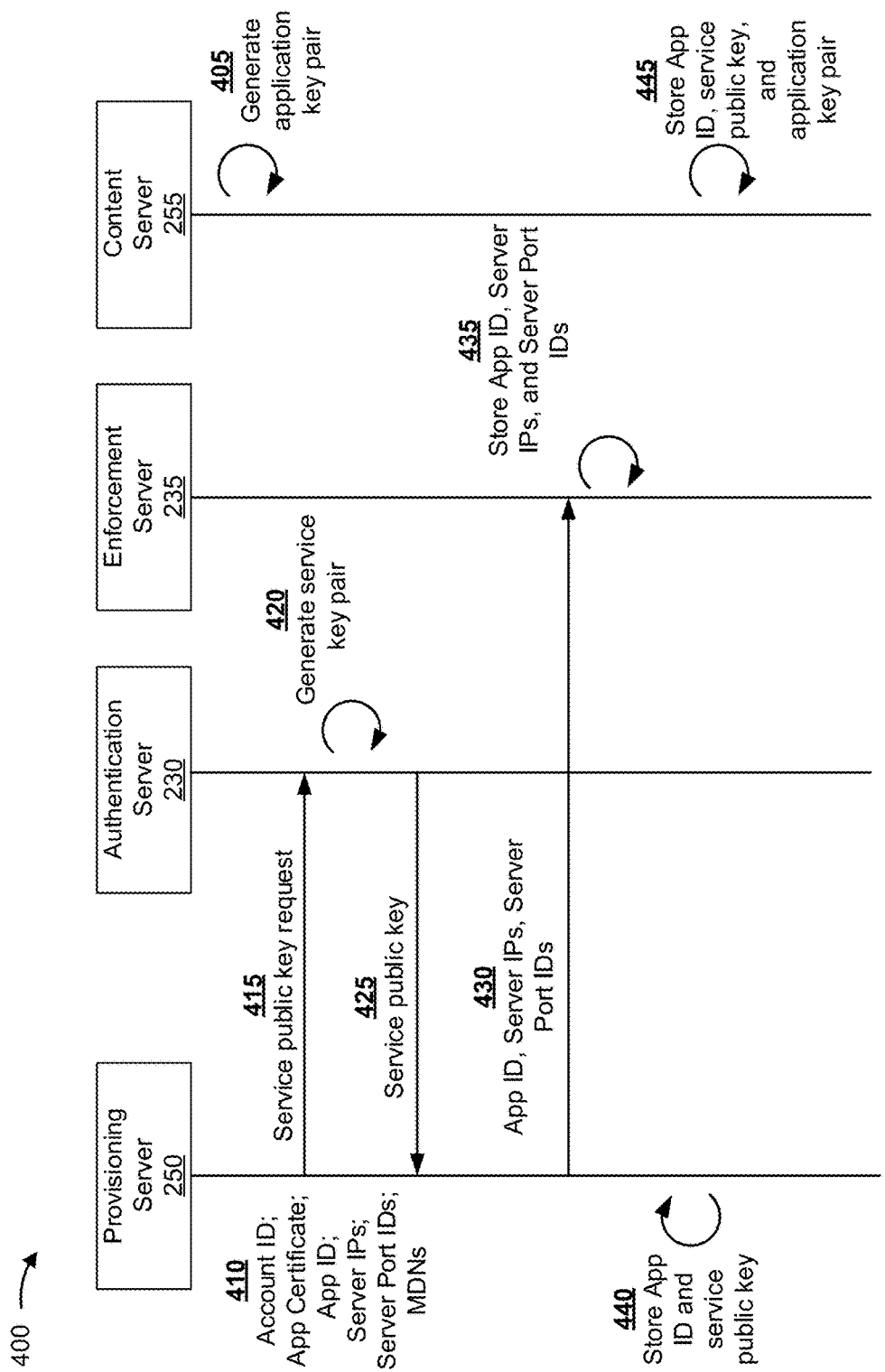
FIG. 4 is a diagram of a call flow of example operations capable of being performed by one or more devices of FIG. 2.

FIG. 4 is a diagram of a call flow of example operations capable of being performed by one or more devices of FIG. 2. For example, FIG. 4 is a call flow diagram of an example call flow 400 for performing service provisioning for a third party application.

As shown in FIG. 4, and by reference number 405, content server 255 can generate an application key pair. As further shown in FIG. 4, and by reference number 410, provisioning server 250 can receive information associated with an application. For example, provisioning server 250 can receive, from a client device (e.g., which might have received an input from a user), information associated with an application. In some implementations, the information can be associated with an application (e.g., a client application) that is capable of being executed by user device 205. For example, user device 205 can execute the application which enables user device 205 to receive content from content server 255 and provide, for display, the content.

In some implementations, provisioning server 250 can generate an account for a registration service to be used in association with the application. For example, as described elsewhere herein, the registration service can enable the automatic registration and authentication of user devices 205 that might execute the application. Additionally, or alternatively, provisioning server 250 can generate an account identifier for the account, and/or can generate an application identifier.

In some implementations, the information associated with the application can include information that identifies an application certificate. For example, the application certificate can include information identifying the application key pair. Additionally, or alternatively, the information associated with the application can include information that identifies a set of content servers 255 to be used in association with the application and/or registration service (e.g., IP addresses, MAC addresses, port identifiers, or the like). Additionally, or alternatively, the information associated with the application can include information that identifies a set of user devices 205 that can use the application and/or registration service (e.g., MDNs, IMEIs, IMSIs, or the like).

In some implementations, provisioning server 250 can store, in a data structure (e.g., a device provisioning table), the information associated with the application (e.g., information that identifies the account identifier, the application identifier, the application certificate, the set of content servers 255, and/or the set of user devices 205).

As further shown in FIG. 4, and by reference number 415, provisioning server 250 can provide, to authentication server 230, a request for a service public key. In some implementations, the request for the service public key can include information that identifies the application identifier, the application certificate, the set of user devices 205, and/or the set of content servers 255.

As further shown in FIG. 4, and by reference number 420, authentication server 230 can generate a service key pair based on the request for the service public key. In some implementations, authentication server 230 can validate the application certificate. Additionally, or alternatively, authentication server 230 can generate a service key pair for the registration service based on validating the application certificate. In some implementations, authentication server 230 can store, in a data structure (e.g., the device provisioning table), information that is associated with the service key pair (e.g., information that identifies the application identifier, the service key pair, the set of user devices 205, and/or the set of content servers 255).

As further shown in FIG. 4, and by reference number 425, authentication server 230 can provide, to provisioning server 250, information that identifies the service public key. As further shown in FIG. 4, and by reference number 430, provisioning server 250 can provide, to enforcement server 235, information that identifies the application identifier and information that identifies the set of content servers 255 (e.g., IP addresses and port identifiers).

As further shown in FIG. 4, and by reference number 435, enforcement server 235 can store, in a data structure (e.g., a flow provisioning table), information for IP session record collection (e.g., information that identifies the application identifier and information that identifies the set of content servers 255).

As further shown in FIG. 4, and by reference number 440, provisioning server 250 can store, in a data structure, information that identifies the application identifier and/or the service public key. As further shown in FIG. 4, and by reference number 445, content server 255 can store, in a data structure (e.g., in an application provisioning table), information associated with keys to be used in association with the registration service (e.g., information that identifies the application identifier, the service public key, the application public key, and/or the application private key).

As indicated above, FIG. 4 is provided merely as an example. Other examples are possible and can differ from what was described with regard to FIG. 4. While a particular series of operations and/or data flows have been described above with regard to FIG. 4, the order of the operations and/or data flows can be modified in other implementations. Further, non-dependent operations can be performed in parallel.

In this way, authentication server 230, enforcement server 235, and/or content server 255 can be provisioned, for a registration service, based on information provided by provisioning server 250 (e.g., which might have received the information from a client device). Additionally, in this way, a third party associated with the content provisioning service can register for the registration service, which enables content server 255 to receive, from authentication server 230, information that identifies a network-based authentication of user device 205, as described elsewhere herein.

Figure 5:
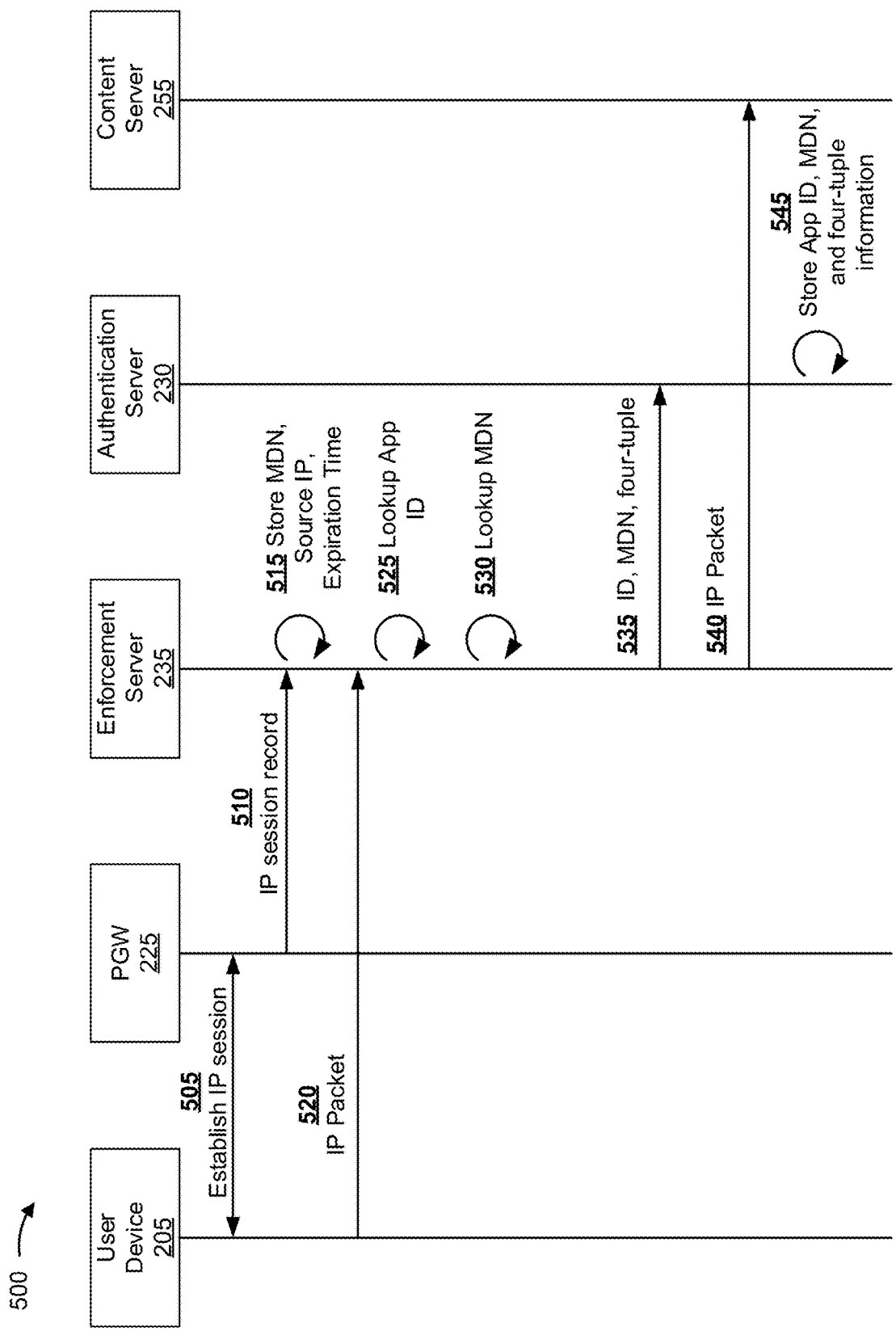
FIG. 5 is a diagram of a call flow of example operations capable of being performed by one or more devices of FIG. 2.

FIG. 5 is a diagram of a call flow of example operations capable of being performed by one or more devices of FIG. 2. For example, FIG. 5 is a call flow diagram of an example call flow 500 for performing IP session flow record collection.

As shown in FIG. 5, and by reference number 505, user device 205 and PGW 225 can establish an IP session (e.g., based on an attach procedure). For example, HSS 240 and/or AAA 245 can perform authentication, registration, session initiation, and/or authorization procedures based on user device 205 accessing a RAN (e.g., the LTE network via base station 210). In some implementations, PGW 225 can establish an IP session for user device 205 based on HSS 240 and/or AAA 245 authenticating user device 205. For example, an IP session can include information identifying a connection of user device 205 to the RAN and/or external packet networks.

As further shown in FIG. 5, and by reference number 510, PGW 225 can provide, to enforcement server 235, information that is associated with the IP session. For example, PGW 225 can provide an IP session record that includes information identifying an MDN of user device 205, an IP address of user device 205, an expiration time of the IP session, or the like.

As further shown in FIG. 5, and by reference number 515, enforcement server 235 can store, in a data structure (e.g., an IP session table), information that is associated with the IP session (e.g., information that identifies the MDN of user device 205, the IP address of user device 205, and/or an expiration time of the IP session).

As further shown in FIG. 5, and by reference number 520, user device 205 can provide, to content server 255, an IP packet. For example, the IP packet can include five-tuple information such as a source address, a destination address, a source port identifier, a destination port identifier, and/or a protocol identifier.

As further shown in FIG. 5, and by reference number 525, enforcement server 235 can identify an application identifier based on the IP packet. For example, enforcement server 235 can search a data structure (e.g., the flow provisioning table) using the destination address and/or the destination port identifier of the IP packet. Additionally, or alternatively, enforcement server 235 can identify an entry including information identifying the application identifier, the IP address of content server 255, and/or the port identifier of content server 255.

As further shown in FIG. 5, and by reference number 530, enforcement server 235 can identify an identifier of user device 205 based on the IP packet. For example, enforcement server 235 can search a data structure (e.g., the IP session table) using the source IP address of the IP packet. Additionally, or alternatively, enforcement server 235 can identify an entry including information associated with an MDN of user device 205, an IP address of user device 205, and/or an expiration time associated with the IP session. In some implementations, enforcement server 235 can determine whether the IP session is active based on the expiration time, and provide information to authentication server 230 based on the IP session being active, as described below.

As further shown in FIG. 5, and by reference number 535, enforcement server 235 can provide, to authentication server 230, information associated with user device 205 based on user device 205 including an active IP session and/or based on user device 205 being authenticated by HSS 240 and/or AAA 245. For example, enforcement server 235 can provide information that identifies the application identifier, an MDN of user device 205, and/or four-tuple information associated with the IP packet (e.g., a source IP address, a destination IP address, a source port identifier, and/or a destination port identifier).

As further shown in FIG. 5, and by reference number 540, enforcement server 235 can provide, to content server 255, the IP packet. As further shown in FIG. 5, and by reference number 545, authentication server 230 can store, in a data structure (e.g., a flow table), information associated with user device 205 and/or content server 255 (e.g., information that identifies the application identifier, the MDN of user device 205, and the four-tuple information). In this way, authentication server 230 can determine, based on the entry, that user device 205 includes an active IP session and/or has been authenticated by HSS 240 and/or AAA 245.

In this way, authentication server 230 can receive information that identifies that user device 205 is (and/or has been) authenticated by HSS 240 and/or AAA 245 (e.g., network-based authentication information). Additionally, in this way, authentication server 230 can provide, to content server 255, network-based authentication information, thereby enabling content server 255 to automatically authenticate and/or register user device 205 to receive content, as described elsewhere herein.

As indicated above, FIG. 5 is provided merely as an example. Other examples are possible and can differ from what was described with regard to FIG. 5. While a particular series of operations and/or data flows have been described above with regard to FIG. 5, the order of the operations and/or data flows can be modified in other implementations. Further, non-dependent operations can be performed in parallel.

Figure 6A:
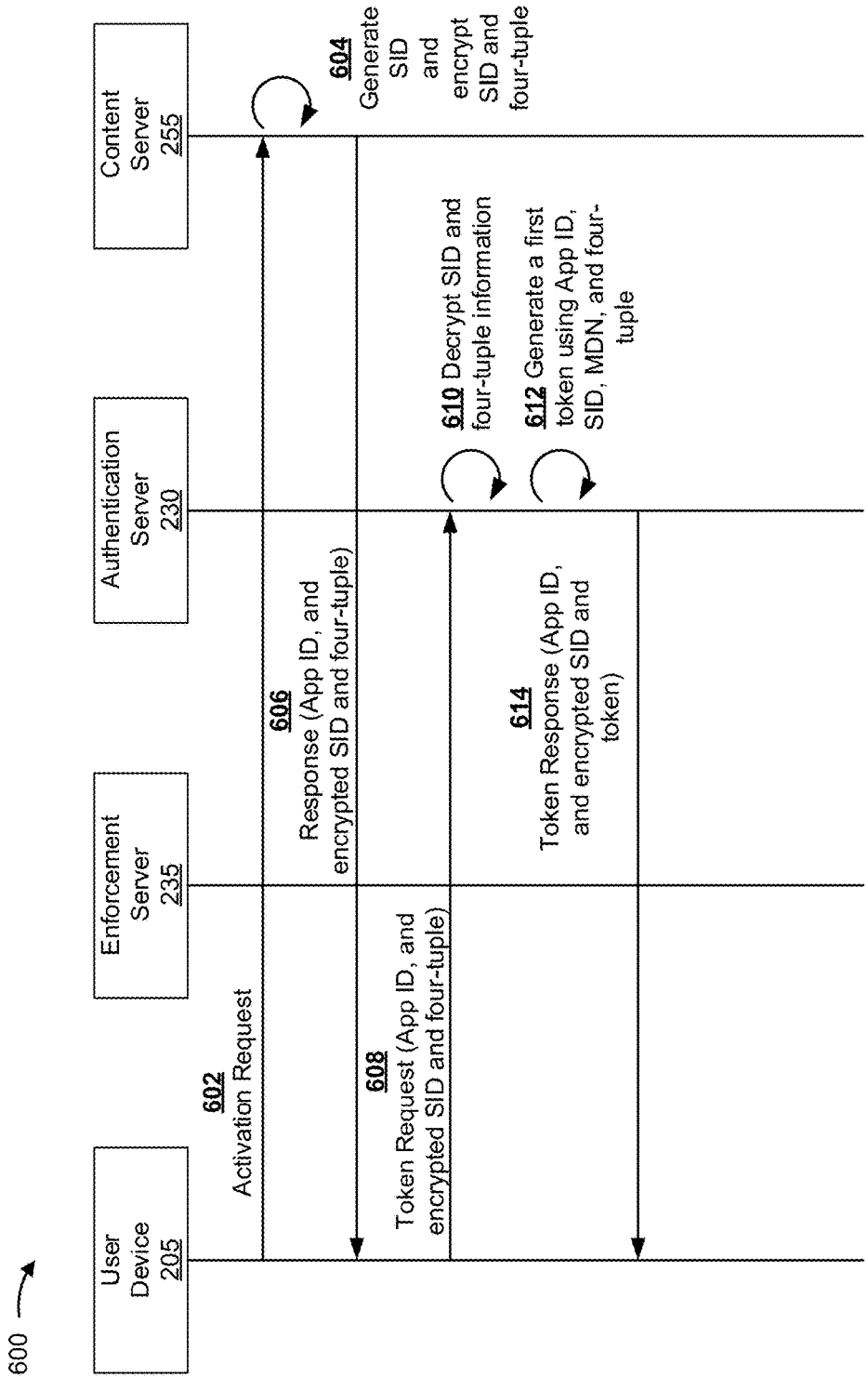
FIGS. 6A and 6B are diagrams of a call flow of example operations capable of being performed by one or more devices of FIG. 2.
Figure 6B:
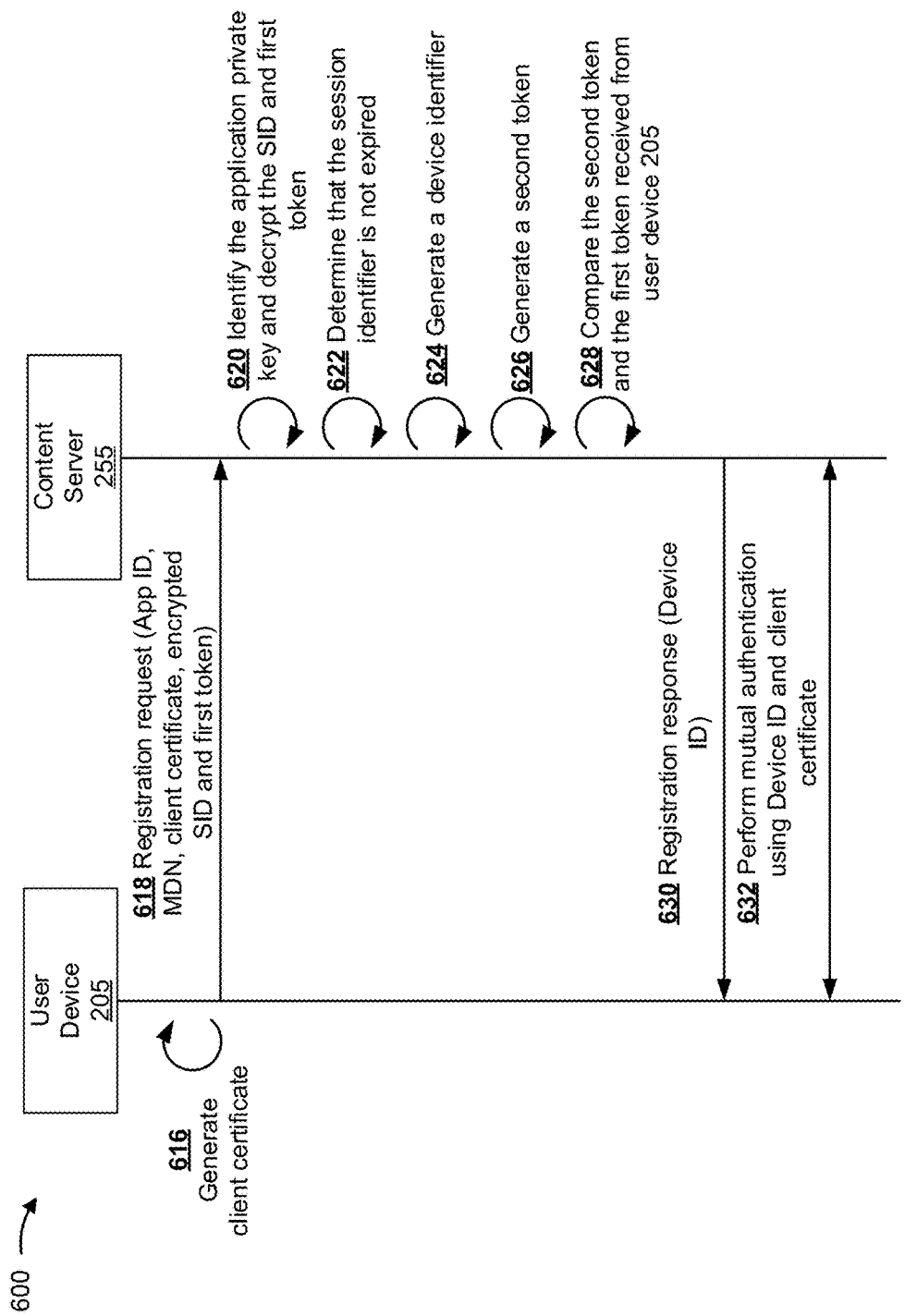

FIGS. 6A and 6B are diagrams of a call flow of example operations capable of being performed by one or more devices of FIG. 2. For example, FIGS. 6A and 6B are call flow diagrams of an example call flow 600 for performing device registration based on network-based authentication information.

As shown in FIG. 6A, and by reference number 602, user device 205 can provide, to content server 255, an activation request. For example, the activation request can be associated with a registration process that enables user device 205 to receive content from content server 255 (e.g., associated with a content provisioning service). In some implementations, the activation request can include information that identifies the application identifier. In some implementations, user device 205 can provide the activation request using a resource identifier (e.g., an activation uniform resource locator (URL), a uniform resource identifier (URI), or the like).

As further shown in FIG. 6A, and by reference number 604, content server 255 can generate a session identifier and encrypt the session identifier and four-tuple information. For example, content server 255 can generate a session identifier based on the activation request. Additionally, content server 255 can store, in a data structure (e.g., an activation table), information that identifies the application identifier, the session identifier, the four-tuple information, and/or an expiration time associated with the session identifier.

In some implementations, content server 255 can encrypt, using the service public key, information that identifies the session identifier and the four-tuple information. By encrypting the session identifier and the four-tuple information using the service public key, content server 255 improves security of the registration process (e.g., reduces counterfeiting) because authentication server 230 includes the service private key and/or user device 205 might not have access to the service private key.

As further shown in FIG. 6A, and by reference number 606, content server 255 can provide, to user device 205, a response to the activation request. In some implementations, the response can include information that identifies the application identifier, and the encrypted session identifier and four-tuple information.

As further shown in FIG. 6A, and by reference number 608, user device 205 can provide, to authentication server 230, a request for a first token. In some implementations, the request for the first token can include information that identifies the application identifier, and the encrypted session identifier and four-tuple information. In some implementations, and as described elsewhere herein, the first token can include information that can be used by content server 255 to determine whether user device 205 has been authenticated by authentication server 230.

As further shown in FIG. 6A, and by reference number 610, authentication server 230 can decrypt the session identifier and the four-tuple information based on the request for the first token. For example, authentication server 230 can search a data structure (e.g., the device provisioning table) using the application identifier, and identify the service private key and the application public key. Additionally, or alternatively, authentication server 230 can decrypt the session identifier and the four-tuple information using the service private key.

In some implementations, authentication server 230 can search a data structure (e.g., the flow table) using the application identifier and the four-tuple information and identify an entry that includes information identifying the application identifier, the MDN of user device 205, and the four-tuple information. In this way, authentication server 230 can determine that user device 205 includes an active IP session and/or has been authenticated by HSS 240 and/or AAA 245. Additionally, in this way, implementations described herein enable automatic user device 205 authentication and/or registration by using network-based authentication information (e.g., received from AAA 245 based on an attach procedure of user device 205).

As further shown in FIG. 6A, and by reference number 612, authentication server 230 can generate the first token. For example, authentication server 230 can use a hashing algorithm and generate the first token, such as a keyed-hash message authentication code (HMAC) or the like, based on information that identifies the application identifier, the session identifier, the MDN of user device 205, and/or the four-tuple information. In some implementations, authentication server 230 can encrypt, using the application public key, the session identifier and the first token. In this way, implementations described herein improve security of the registration process because content server 255 can include the application private key whereas user device 205 might not have access to the application private key.

As further shown in FIG. 6A, and by reference number 614, authentication server 230 can provide, to user device 205, a response to the request for the first token. In some implementations, the response can include information that identifies the application identifier, and the encrypted session identifier and first token.

As shown in FIG. 6B, and by reference number 616, user device 205 can generate a client certificate. In some implementations, the client certificate can include information that identifies a client key pair (e.g., a pair of keys to be used in association with the content provisioning service associated with user device 205 and content server 255).

As further shown in FIG. 6B, and by reference number 618, user device 205 can provide, to content server 255, a registration request. For example, the registration request can include information that identifies the application identifier, the MDN of user device 205, the client certificate, and/or the encrypted session identifier and first token.

As further shown in FIG. 6B, and by reference number 620, content server 255 can identify the application private key and decrypt the session identifier and first token. For example, content server 255 can search a data structure (e.g., the application provisioning table) using the application identifier and identify the application private key. Additionally, or alternatively, content server 255 can decrypt, using the application private key, the encrypted session identifier and first token.

As further shown in FIG. 6B, and by reference number 622, content server 255 can determine that the session identifier is not expired. For example, content server 255 can search a data structure (e.g., the activation table) using the application identifier and the session identifier, and determine that the session identifier is not expired based on the expiration time associated with the entry in the data structure.

As further shown in FIG. 6B, and by reference number 624, content server 255 can generate a device identifier based on the session identifier not being expired. For example, content server 255 can search a data structure (e.g., the device provisioning table) using the MDN of user device 205, and determine that user device 205 was provisioned to use the registration service (e.g., as described above in connection with FIG. 4). Additionally, or alternatively, content server 255 can generate a device identifier for user device 205 to use in association with the registration service.

As further shown in FIG. 6B, and by reference number 626, content server 255 can generate a second token. For example, content server 255 can generate the second token using the application identifier, the session identifier, the MDN of user device 205, and/or the four-tuple information. That is, content server 255 can generate the second token using the same type of information as authentication server 230 used when generating the first token, as described above in connection with operation 612.

As further shown in FIG. 6B, and by reference number 628, content server 255 can compare the second token (e.g., generated by content server 255) and the first token (e.g., generated by authentication server 230 and provided by user device 205). In some implementations, content server 255 can determine that the tokens match (i.e., are the same). Additionally, or alternatively, content server 255 can store, in a data structure (e.g., a device registration table), information that indicates that user device 205 is registered to receive content from content server 255. For example, content server 255 can store information that identifies the account identifier, the application identifier, the MDN of user device 205, the device identifier, the client certificate, and a registration status (i.e., registered).

As further shown in FIG. 6B, and by reference number 630, content server 255 can provide, to user device 205, a registration response. For example, the registration response can include information that identifies the device identifier.

As further shown in FIG. 6B, and by reference number 632, user device 205 and content server 255 can perform mutual authentication using the device identifier and the client certificate. In this way, implementations described herein enable user device 205 to be automatically registered and/or authenticated to use a content provisioning service based on network-based authentication information.

In this way, implementations described herein reduce a need for manual configuration, improve security during the registration process by reducing counterfeiting of credentials, and improve scalability of content provisioning in multi-device content distribution platforms (e.g., where hundreds, thousands, millions, etc. of devices are to be registered to receive content).

As indicated above, FIGS. 6A and 6B are provided merely as an example. Other examples are possible and can differ from what was described with regard to FIGS. 6A and 6B. While a particular series of operations and/or data flows have been described above with regard to FIGS. 6A and 6B, the order of the operations and/or data flows can be modified in other implementations. Further, non-dependent operations can be performed in parallel.

Figure 7:
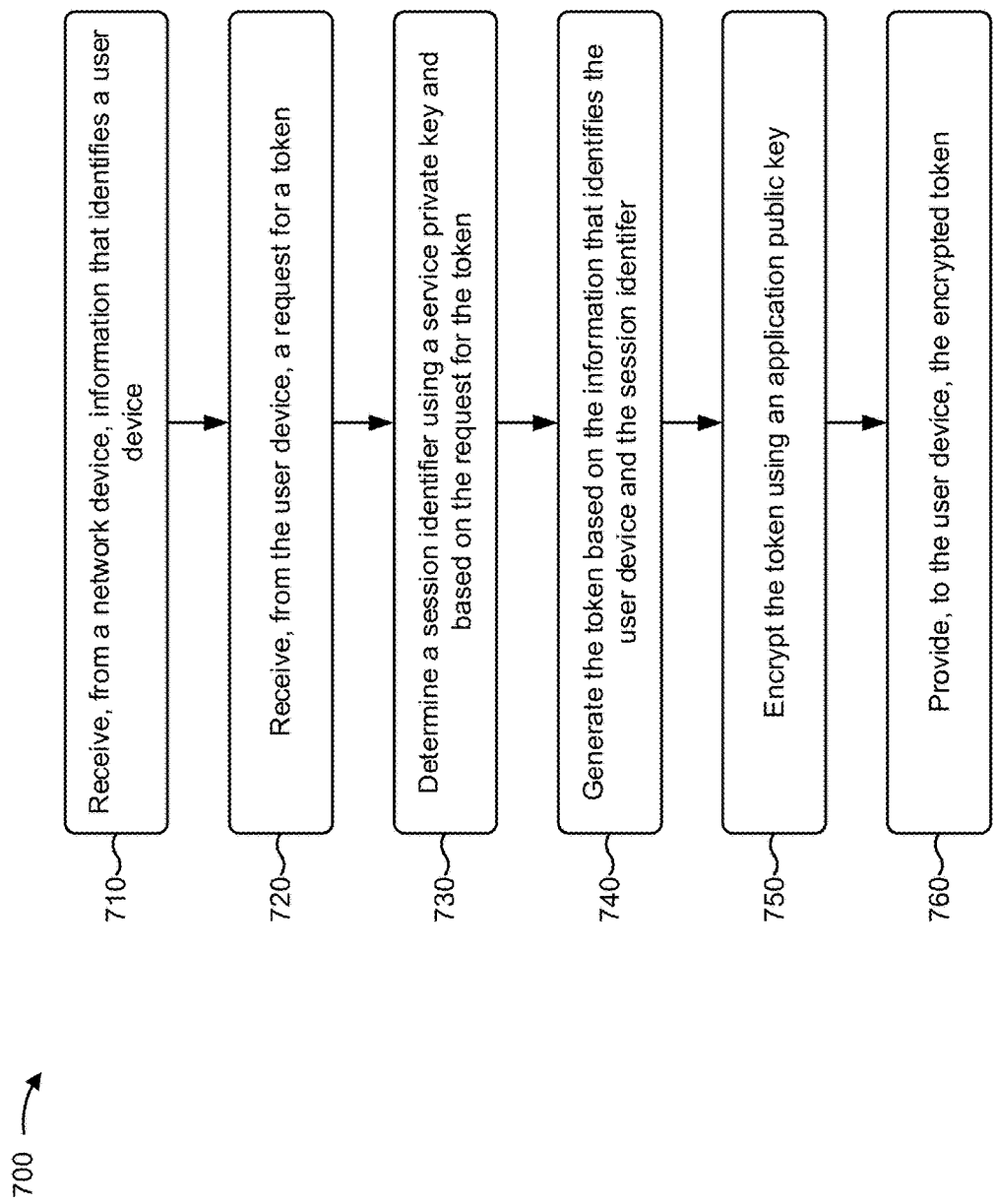
FIG. 7 is a flow chart of an example process for performing network-based device registration for content distribution platforms.

FIG. 7 is a flow chart of an example process 700 for performing network-based device registration for content distribution platforms. In some implementations, one or more process blocks of FIG. 7 can be performed by authentication server 230. In some implementations, one or more process blocks of FIG. 7 can be performed by another device or a group of devices separate from or including authentication server 230, such as user device 205, base station 210, MME 215, SGW 220, PGW 225, HSS 240, AAA 245, provisioning server 250, and/or content server 255.

As shown in FIG. 7, process 700 can include receiving, from a network device, information that identifies a user device (block 710). For example, authentication server 230 can receive, from enforcement server 235 (e.g., which might have received the information from PGW 225, HSS 240, and/or AAA 245), information that identifies user device 205. In some implementations, authentication server 230 can receive the information that identifies user device 205 in a similar manner as described above in connection with operation 535 of FIG. 5 and/or as described elsewhere herein.

As further shown in FIG. 7, process 700 can include receiving, from a user device, a request for a token (block 720). For example, authentication server 230 can receive, from user device 205, a request for a token. In some implementations, authentication server 230 can receive the request for the token in a similar manner as described above in connection with operation 608 of FIG. 6A and/or as described elsewhere herein.

As further shown in FIG. 7, process 700 can include determining a session identifier using a service private key and based on the request for the token (block 730). For example, authentication server 230 can determine a session identifier using a service private key and based on the request for the token. In some implementations, authentication server 230 can determine the session identifier in a similar manner as described above in connection with operation 610 of FIG. 6A and/or as described elsewhere herein.

As further shown in FIG. 7, process 700 can include generating the token based on the information that identifies the user device and the session identifier (block 740). For example, authentication server 230 can generate the token based on the information that identifies user device 205 and the session identifier. In some implementations, authentication server 230 can generate the token in a similar manner as described above in connection with operation 612 of FIG. 6A and/or as described elsewhere herein.

As further shown in FIG. 7, process 700 can include encrypting the token using an application public key (block 750). For example, authentication server 230 can encrypt the token using an application public key. In some implementations, authentication server 230 can encrypt the token in a similar manner as described above in connection with operation 612 of FIG. 6A and/or as described elsewhere herein.

As further shown in FIG. 7, process 700 can include providing, to the user device, the encrypted token (block 760). For example, authentication server 230 can provide, to user device 205, the encrypted token. In some implementations, authentication server 230 can provide the encrypted token in a similar manner as described above in connection with operation 614 of FIG. 6A and/or as described elsewhere herein.

Although FIG. 7 shows example blocks of process 700, in some implementations, process 700 can include additional blocks, fewer blocks, different blocks, or differently arranged blocks than those depicted in FIG. 7. Additionally, or alternatively, two or more of the blocks of process 700 can be performed in parallel.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, coupled to the one or more memories, to:
receive, from a network device, information that identifies a user device,
the user device to access a radio access network associated with the network device,
the network device to authenticate the user device based on the user device accessing the radio access network, and
the network device to provide, to the device, the information that identifies the user device based on authenticating the user device;
receive, from the user device, a request for a first token,
a server device to encrypt a session identifier using a service public key to generate an encrypted session identifier,
the server device to provide, to the user device, information that identifies the encrypted session identifier, and
the request including the information that identifies the encrypted session identifier;
determine the session identifier using a service private key;
generate the first token based on the information that identifies the user device and the session identifier;
encrypt the first token using an application public key to generate an encrypted first token; and
provide, to the user device, information that identifies the encrypted first token,
the user device to provide, to the server device, a registration request that includes information that identifies the encrypted first token,
the server device to decrypt the encrypted first token using an application private key,
the server device to generate a second token based on other information associated with the user device and the session identifier,
the server device to compare the first token and the second token,
the server device to provide, to the user device, a device identifier based on comparing the first token and the second token, and
the device identifier to enable the user device to receive content associated with the server device.

2. The device of claim 1, where the one or more processors are further to:
receive a request for the service public key,
the request including an application identifier and information that identifies the server device;
generate the service public key and the service private key based on the application identifier and the information that identifies the server device; and
provide, to the server device, information that identifies the service public key.

3. The device of claim 1, where the request for the first token includes an application identifier; and
where the one or more processors, when determining the session identifier, are to:
determine the session identifier using the service private key and the application identifier.

4. The device of claim 1, where the one or more processors are further to:
receive, from the network device, information that identifies an application identifier and information that identifies the server device; and
where the one or more processors, when generating the first token, are to:
generate the first token based on the information that identifies the user device, the application identifier, and the information that identifies the server device.

5. The device of claim 1, where the one or more processors are further to:
identify the application public key based on the request for the first token; and
where the one or more processors, when encrypting the first token using the application public key, are to:
encrypt the first token using the application public key based on identifying the application public key.

6. The device of claim 1, where the one or more processors are further to:
identify information that identifies a first network address of the user device and a second network address of the server device based on the request for the first token; and
where the one or more processors, when generating the first token, are to:
generate the first token based on the first network address and the second network address.

7. The device of claim 1, where the one or more processors are further to:
   identify the service private key based on an application identifier; and
   where the one or more processors, when determining the session identifier, are to:
      determine the session identifier based on identifying the service private key.

8. A non-transitory computer-readable medium storing instructions, the instructions comprising:
   one or more instructions that, when executed by one or more processors, cause the one or more processors to:
      receive, from a network device, information that identifies a user device,
         the user device to access a network associated with the network device,
         the network device to authenticate the user device based on the user device accessing the network, and
         the network device to provide the information that identifies the user device based on authenticating the user device;
      receive, from the user device, a request for a first token,
         the request including information that identifies an encrypted session identifier,
         a server device to encrypt the session identifier using a service public key, and
         the server device to provide, to the user device, the encrypted session identifier;
      determine the session identifier using a service private key;
      generate the first token based on the information that identifies the user device and the session identifier;
      encrypt the first token using an application public key; and
      provide, to the user device, the encrypted first token,
         the user device to provide, to the server device, a registration request that includes the encrypted first token,
         the server device to decrypt the encrypted first token using an application private key,
         the server device to generate a second token based on other information that identifies the user device and the session identifier,
         the server device to compare the first token and the second token,
         the server device to selectively authenticate the user device based on comparing the first token and the second token.

9. The non-transitory computer-readable medium of claim 8, where the one or more instructions, when executed by the one or more processors, further cause the one or more processors to:
   receive a request for the service public key; and
   provide, to the server device, information that identifies the service public key based on the request.

10. The non-transitory computer-readable medium of claim 8, where the request for the first token includes an application identifier; and
   where the one or more instructions, that cause the one or more processors to generate the first token, cause the one or more processors to:
      generate the first token based on the application identifier.

11. The non-transitory computer-readable medium of claim 8, where the one or more instructions, when executed by the one or more processors, further cause the one or more processors to:
   receive, from the network device, information that identifies an application identifier and information that identifies the server device; and
   where the one or more instructions, that cause the one or more processors to generate the first token, cause the one or more processors to:
      generate the first token based on the information that identifies the application identifier and the information that identifies the server device.

12. The non-transitory computer-readable medium of claim 8, where the one or more instructions, when executed by the one or more processors, further cause the one or more processors to:
   identify the application public key based on the request for the first token; and
   where the one or more instructions, that cause the one or more processors to encrypt the first token using the application public key, cause the one or more processors to:
      encrypt the first token based on identifying the application public key.

13. The non-transitory computer-readable medium of claim 8, where the one or more instructions, when executed by the one or more processors, further cause the one or more processors to:
   receive, from the network device, four-tuple information associated with the user device and the server device; and
   where the one or more instructions, that cause the one or more processors to generate the first token, cause the one or more processors to:
      generate the first token based on the four-tuple information.

14. The non-transitory computer-readable medium of claim 8, where the one or more instructions, when executed by the one or more processors, further cause the one or more processors to:
   identify the service private key based on an application identifier; and
   where the one or more instructions, that cause the one or more processors to determine the session identifier, cause the one or more processors to:
      determine the session identifier based on identifying the service private key.

15. A method, comprising:
   receiving, by a device and from a network device, information that identifies a user device,
      the user device to access a radio access network associated with the network device,
      the network device to authenticate the user device based on the user device accessing the radio access network, and
      the network device to provide the information that identifies the user device based on authenticating the user device;
   receiving, by the device and from the user device, a request for a first token,
      the request including an encrypted session identifier,
      a server device to encrypt the session identifier using a service public key, and
      the server device to provide, to the user device, the encrypted session identifier;

determining, by the device, the session identifier using a service private key;
generating, by the device, the first token based on the information that identifies the user device and the session identifier;
encrypting, by the device, the first token using an application public key to generate an encrypted first token; and
providing, by the device and to the user device, the encrypted first token,
  the user device to provide, to the server device, a registration request that includes the encrypted first token,
  the server device to decrypt the encrypted first token using an application private key,
  the server device to generate a second token based on other information that identifies the user device and the session identifier,
  the server device to compare the first token and the second token,
  the server device to provide, to the user device, a device identifier based on comparing the first token and the second token, and
  the device identifier to enable the user device to receive content associated with the server device.

16. The method of claim 15, further comprising:
receiving a request for the service public key;
generating the service public key and the service private key based on the request; and
providing, to the server device, the service public key.

17. The method of claim 15, further comprising:
receiving, from the user device, information that identifies an application identifier and the server device based on the request for the first token; and
where generating the first token comprises:
  generating the first token based on the information that identifies the application identifier and the server device.

18. The method of claim 15, further comprising:
receiving, from the network device, information that identifies an application identifier, the user device, and the server device; and
where generating the first token comprises:
  generating the first token based on the information that identifies the application identifier, the user device, and the server device.

19. The method of claim 15, further comprising:
identifying the application public key based on the request for the first token; and
where encrypting the first token comprises:
  encrypting the first token based on identifying the application public key.

20. The method of claim 15, where the information that identifies the user device includes a mobile directory number.

* * * * *